United States Patent
Umekage et al.

(10) Patent No.: US 8,934,116 B2
(45) Date of Patent: Jan. 13, 2015

(54) LINE CONCENTRATOR AND INFORMATION PROCESSING SYSTEM USING THE SAME, ASSIGNING TRANSMITTED DATA TO ALL DEVICES IN THE GROUP OF INFORMATION PROCESSING DEVICES

(75) Inventors: Atsushi Umekage, Chiba (JP); Hiroshi Takatani, Nara (JP); Norihide Kunikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 2213 days.

(21) Appl. No.: 10/572,421

(22) PCT Filed: Sep. 13, 2004

(86) PCT No.: PCT/JP2004/013338
§ 371 (c)(1),
(2), (4) Date: Mar. 17, 2006

(87) PCT Pub. No.: WO2005/029782
PCT Pub. Date: Mar. 31, 2005

(65) Prior Publication Data
US 2007/0081541 A1    Apr. 12, 2007

(30) Foreign Application Priority Data
Sep. 22, 2003 (JP) .................. 2003-329829

(51) Int. Cl.
*G06F 3/12* (2006.01)
*H04L 12/46* (2006.01)

(52) U.S. Cl.
CPC ................... *H04L 12/4641* (2013.01)
USPC ............ 358/1.15; 358/1.13; 709/223

(58) Field of Classification Search
USPC ............ 709/223; 358/1.13, 1.15; 370/338; 101/484; 400/76
See application file for complete search history.

(56) References Cited

U.S. PATENT DOCUMENTS 5,394,402 A    2/1995 Ross
6,707,566 B1 *    3/2004 Endoh ............ 358/1.15

(Continued)

FOREIGN PATENT DOCUMENTS

CN    1321004 A    11/2001
JP    05-265672    10/1993

(Continued)

OTHER PUBLICATIONS

"The Summarization on Virtual LAN Technology," Chen, Yu-xiao et al., O.I. Automation, 2002, vol. 21, No. 6, pp. 41-44.

(Continued)

*Primary Examiner* — Nicholas Pachol
(74) *Attorney, Agent, or Firm* — Edwards Wildman Palmer LLP; David G. Conlin; Steven M. Jensen

(57) ABSTRACT

A line concentrator classifies printers connected via a communications network into groups according to the capabilities of the printers and includes a storage section which stores a VLAN table classifying the printers into groups and listing virtual addresses corresponding to the respective groups. When a monitoring section receives data addressed to a virtual address, it refers to the VLAN table and performs controls so as to transmit the received data to all of the printers belonging to the group corresponding to the virtual address. Thus, it is possible to eliminate the problem, such as concentration of jobs to a specific information processing device, and to provide a line concentrator capable of rapidly performing data transfer processing.

22 Claims, 16 Drawing Sheets

(56) References Cited

U.S. PATENT DOCUMENTS

| | | | |
|---|---|---|---|
| 6,735,626 B1* | 5/2004 | Tezuka et al. | 709/223 |
| 2001/0038462 A1* | 11/2001 | Teeuwen et al. | 358/1.15 |
| 2002/0027673 A1* | 3/2002 | Roosen et al. | 358/1.15 |
| 2002/0116439 A1* | 8/2002 | Someshwar et al. | 709/104 |
| 2003/0002077 A1* | 1/2003 | Shima | 358/1.15 |
| 2003/0005100 A1* | 1/2003 | Barnard et al. | 709/223 |
| 2003/0018829 A1* | 1/2003 | Carney et al. | 709/321 |
| 2003/0117638 A1* | 6/2003 | Ferlitsch | 358/1.13 |
| 2004/0070779 A1* | 4/2004 | Ferlitsch | 358/1.13 |
| 2004/0085944 A1* | 5/2004 | Boehm | 370/338 |
| 2004/0126167 A1* | 7/2004 | Roosen et al. | 400/76 |
| 2004/0190042 A1* | 9/2004 | Ferlitsch et al. | 358/1.15 |
| 2006/0140698 A1* | 6/2006 | Nishi | 400/62 |
| 2006/0191435 A1* | 8/2006 | Fujihara | 101/484 |

FOREIGN PATENT DOCUMENTS

| | | |
|---|---|---|
| JP | 09-319533 | 12/1997 |
| JP | 10-093585 | 4/1998 |
| JP | 10-190715 | 7/1998 |
| JP | 11-331453 | 11/1999 |
| JP | 2000-003259 | 1/2000 |
| JP | 2001-066950 | 3/2001 |
| JP | 2002-366522 | 12/2002 |
| JP | 2003-174449 | 6/2003 |

OTHER PUBLICATIONS

Virtual LAN, Internetworking, vol. 3, No. 2, Feb. 1997, pp. 1-12.

* cited by examiner

FIG. 9 (amended)

| VIRTUAL MAC ADDRESS | MAC ADDRESS | PORT INFORMATION | DEVICE INFORMATION | VLAN NUMBER | SUBNET ADDRESS |
|---|---|---|---|---|---|
| VIRTUAL MAC ADDRESS A | MAC ADDRESS 1 | P1 | A4, COLOR | 1 | 192.168.11.0/24 |
| VIRTUAL MAC ADDRESS A | MAC ADDRESS 2 | P2 | A4, COLOR | 1 | 192.168.11.0/24 |
| VIRTUAL MAC ADDRESS A | MAC ADDRESS 3 | P3 | A4, COLOR | 1 | 192.168.11.0/24 |
| VIRTUAL MAC ADDRESS B | MAC ADDRESS 4 | P4 | A3, MONOCHROME | 2 | 192.168.12.0/24 |
| VIRTUAL MAC ADDRESS B | MAC ADDRESS 5 | P5 | A3, MONOCHROME | 2 | 192.168.12.0/24 |
| VIRTUAL MAC ADDRESS C | MAC ADDRESS 6 | P6 | A4, MONOCHROME | 3 | 192.168.13.0/24 |
| VIRTUAL MAC ADDRESS C | MAC ADDRESS 7 | P7 | A4, MONOCHROME | 3 | 192.168.13.0/24 |
| — | MAC ADDRESS a | P8 | HOST | 11 | 192.168.1.0/24 |
| — | OWN MAC ADDRESS | — | own | — | |

FIG. 10

| EXTERNAL IP ADDRESS | INTERNAL IP ADDRESS |
|---|---|
| IP ADDRESS a | IP ADDRESS 1 |
| IP ADDRESS b | IP ADDRESS 2 |
| IP ADDRESS c | IP ADDRESS 3 |
| IP ADDRESS d | IP ADDRESS 4 |
| IP ADDRESS e | IP ADDRESS 5 |
| IP ADDRESS f | IP ADDRESS 6 |
| IP ADDRESS g | IP ADDRESS 7 |

FIG. 11

| EXTERNAL IP ADDRESS | PORT NUMBER | INTERNAL IP ADDRESS | PORT NUMBER |
|---|---|---|---|
| VIRTUAL IP ADDRESS | :a | IP ADDRESS 1 | :A |
| VIRTUAL IP ADDRESS | :b | IP ADDRESS 2 | :B |
| VIRTUAL IP ADDRESS | :c | IP ADDRESS 3 | :C |
| VIRTUAL IP ADDRESS | :d | IP ADDRESS 4 | :D |
| VIRTUAL IP ADDRESS | :e | IP ADDRESS 5 | :E |
| VIRTUAL IP ADDRESS | :f | IP ADDRESS 6 | :F |
| VIRTUAL IP ADDRESS | :g | IP ADDRESS 7 | :G |

FIG. 17

| VIRTUAL MAC ADDRESS | MAC ADDRESS | DEVICE INFORMATION | VLAN NUMBER | SUBNET ADDRESS | IP ADDRESS |
|---|---|---|---|---|---|
| VIRTUAL MAC ADDRESS A | MAC ADDRESS 1 | A4, COLOR | 1 | 192.168.11.0/24 | 192.168.11.1 |
| VIRTUAL MAC ADDRESS A | MAC ADDRESS 2 | A4, COLOR | 1 | 192.168.11.0/24 | 192.168.11.2 |
| VIRTUAL MAC ADDRESS A | MAC ADDRESS 3 | A4, COLOR | 1 | 192.168.11.0/24 | 192.168.11.3 |
| VIRTUAL MAC ADDRESS B | MAC ADDRESS 4 | A3, MONOCHROME | 2 | 192.168.12.0/24 | 192.168.12.1 |
| VIRTUAL MAC ADDRESS B | MAC ADDRESS 5 | A3, MONOCHROME | 2 | 192.168.12.0/24 | 192.168.12.2 |
| VIRTUAL MAC ADDRESS C | MAC ADDRESS 6 | A4, MONOCHROME | 3 | 192.168.13.0/24 | 192.168.13.1 |
| VIRTUAL MAC ADDRESS C | MAC ADDRESS 7 | A4, MONOCHROME | 3 | 192.168.13.0/24 | 192.168.13.2 |
| — | MAC ADDRESS a | HOST | 11 | 192.168.1.0/24 | 192.168.1.1 |
| — | OWN MAC ADDRESS | own | — | | |

FIG. 18

| VIRTUAL MAC ADDRESS | MAC ADDRESS | PORT INFORMATION | DEVICE INFORMATION | VLAN NUMBER | SUBNET ADDRESS | IP ADDRESS |
|---|---|---|---|---|---|---|
| VIRTUAL MAC ADDRESS A | MAC ADDRESS 1 | P 1 | A4, COLOR | 1 | 192.168.11.0/24 | 192.168.11.1 |
| VIRTUAL MAC ADDRESS A | MAC ADDRESS 2 | P 2 | A4, COLOR | 1 | 192.168.11.0/24 | 192.168.11.2 |
| VIRTUAL MAC ADDRESS A | MAC ADDRESS 3 | P 3 | A4, COLOR | 1 | 192.168.11.0/24 | 192.168.11.3 |
| VIRTUAL MAC ADDRESS B | MAC ADDRESS 4 | P 4 | A3, MONOCHROME | 2 | 192.168.12.0/24 | 192.168.12.1 |
| VIRTUAL MAC ADDRESS B | MAC ADDRESS 5 | P 5 | A3, MONOCHROME | 2 | 192.168.12.0/24 | 192.168.12.2 |
| VIRTUAL MAC ADDRESS C | MAC ADDRESS 6 | P 6 | A4, MONOCHROME | 3 | 192.168.13.0/24 | 192.168.13.1 |
| VIRTUAL MAC ADDRESS C | MAC ADDRESS 7 | P 7 | A4, MONOCHROME | 3 | 192.168.13.0/24 | 192.168.13.2 |
| – | MAC ADDRESS a | P 8 | HOST | 11 | 192.168.1.0/24 | 192.168.1.1 |
| – | OWN MAC ADDRESS | – | own | – | | |

LINE CONCENTRATOR AND INFORMATION PROCESSING SYSTEM USING THE SAME, ASSIGNING TRANSMITTED DATA TO ALL DEVICES IN THE GROUP OF INFORMATION PROCESSING DEVICES

This application is a National Stage Filing of PCT Application No. PCT/JP2004/013338, filed Sep. 13, 2004, the teachings of which being incorporated herein by reference.

TECHNICAL FIELD

The present invention relates to a line concentrator, a relay control method, an information processing device, a DHCP server, and a DHCP processing method, all of which are provided in an information processing system, such as an image output system, where a plurality of external devices including, for example, a copier, a scanner, and an MFP (Multi Function Printer) are connected to one another via a network.

BACKGROUND ART

With improved performance and price-reduction of computers, the construction of a network system has been recently developed where peripheral equipments shared in a communications network such as LAN (Local Area Network) performs various operations under the instructions from computers.

Peripheral devices shared in the communications network are, for example, a copier, a scanner, an image forming device such as MFP. Such a network system is constructed that a plurality of image forming devices are connected to each other over the LAN. This allows the plurality of image forming devices to execute print jobs transmitted from a computer. In such an image output system, a device to perform output in response to each print job supplied is usually designated at the time when an output instruction is issued, and the print job is transmitted to the designated device.

In such an image output system, however, it can be considered that there could occur concentration of job output requests to a specific image forming device. Specifically, there could occur the following situation: one device is in a standby state, while the other one is so busy that it waits for outputs for incoming jobs. This may cause inefficient use of the image forming devices.

On this account, it is preferable that an image forming device to execute a print job is selected according to the printing status of the image forming devices. Further, it is preferable that if the amount of data to be processed for a print job is large, the load of processing the data can be shared by a plurality of image forming devices.

Further, the case of using MFPs for the image forming devices causes the following situation: Under circumstances where all of the MFPs connected to the communications network are in the course of printing, a user who needs copying must wait until any of the MFPs completes its printing operation. It is therefore preferable that the distribution of jobs is controlled so that there always exists an image forming device which is not busy.

In order to solve such a problem, an image output system has been suggested that the settlement (negotiation) of jobs is performed among the plurality of image forming devices on the communications network, and such settlement can be realized with an increased use efficiency of the image forming devices and without increase of the load on the network (see, for example, Japanese Unexamined Patent Publication No. 319533/1997 (Tokukaihei 9-319533; published on Dec. 12, 1997), Japanese Unexamined Patent Publication No. 003259/2000 (Tokukai 2000-003259; published on Jan. 7, 2000), Japanese Unexamined Patent Publication No. 066950/2001 (Tokukai 2001-066950; published on Mar. 16, 2001), Japanese Unexamined Patent Publication No. 331453/1999 (Tokukaihei 11-331453; published on Nov. 30, 1999)).

For example, Japanese Unexamined Patent Publication No. 319533/1997 (Tokukaihei 9-319533) discloses an image output system such that printers having common characteristics are grouped together so that output data is distributed automatically to a printer having the capability that the user needs. In this image output system, a printer server manages the printers having the same capability by grouping such printers.

A host that provides an instruction for a print job designates a printer group supporting the capability that is needed for printing operation of the instructed print job, rather than designates a specific printer to execute the print job. Considering operating statuses of the printers which are included in the printer group having been designated by the host, the printer server selects a printer to execute the print job, and transmits print data to the selected printer so that the selected printer executes the print job.

However, the conventional image output system described above has the following problems: In the image output system disclosed in Patent Document 1, the printer server performs a centralized management of all the printers on the communications network. In this arrangement, there is the problem that inoperable condition of the printer server for some reason stops the operations of the overall image output system.

Further, receiving a print job from the host, the printer server temporarily holds data of the print job. Then, the printer server selects a printer to execute the received print job from the printer group supporting the capability that is needed for printing operation of the received print job, considering their operating statuses. Thereafter, the printer server transmits the temporarily held print job to the selected printer. That is, the print job having been transmitted from the host is temporarily held by the printer server. After having completed distribution process, the printer server transmits the print job to the selected printer. This raises the problem of a long processing time between the instant when the print instruction is given and the instant when the printing operation is started. This problem becomes more pronounced especially in the case when a plurality of print jobs are transmitted to the printer server around the same time.

Further, the print job is transmitted to only the printer that has been selected by the printer server. Thus, under the circumstances where the selected printer cannot perform printing operation when trouble occurs, the printer server must be capable of transferring to another printer the print job that the selected printer has been supposed to execute. In such a case, when the printer server detects that trouble occurs in one printer, the printer server performs the process of selecting other printer to execute the printer job having been previously instructed to the printer with the trouble, and thereafter performs the process of transmitting the print job to newly selected printer. This raises not only the problem that the load on the printer server increases in processing, but also the problem that a quick response to the print job cannot be performed due to much time required for the transfer of the print job.

The present invention has been attained in view of the above problem, and an object thereof is to provide a line concentrator, a relay control method, a relay control program, a storage medium storing the relay control program, an information processing device, a DHCP server, a DHCP processing method, a DHCP processing program, a storage medium storing the DHCP processing program, and an information processing system, all of which solves the problems, such as concentration of jobs to a specific information processing device, and realizes a rapid data transfer processing.

DISCLOSURE OF INVENTION

In order to solve the above problem, a line concentrator according to the present invention is a line concentrator which relays data transmission via a transmission medium, the line concentrator comprising: control means which controls operations performed in the line concentrator; and storage means which stores a group information table (i) classifying information processing devices connected via the transmission medium into groups according to capabilities of the information processing devices and (ii) listing virtual addresses corresponding to the respective groups, the control means including data monitoring means which refers to the group information table stored in the storage means upon receipt of data addressed to the virtual address, and performs controls so that the received data is transmitted to all of the information processing devices belonging to the group corresponding to the virtual address to which the received data is addressed.

Further, a relay control method according to the present invention is a relay control method of a line concentrator which relays data transmission via a transmission medium, the method comprising: the step of storing a group information table (i) classifying information processing devices connected via the transmission medium into groups according to capabilities of the information processing devices and (ii) listing virtual addresses corresponding to the respective groups; and the step of referring to the group information table upon receipt of data addressed to the virtual address and performing controls so that the received data is transmitted to all of the information processing devices belonging to the group corresponding to the virtual address to which the received data is addressed.

According to such arrangement and method, a host which instructs information processing of data only needs to transmit the data addressing to a virtual address corresponding to a group having the capability required for the processing of such data. More specifically, the host does not need to transmit data as a job addressing to a specific information processing device, but only needs to transmit data addressing to a virtual address corresponding to a group having the capability required for the execution of the job. This eliminates for the host the need to consider operating status of the information processing device to which the host instructs a job and other conditions.

Further, the line concentrator transfers received data to all of the information processing devices belonging to a group corresponding to a virtual address. Among the information processing devices having received the data, the information processing device which can process the received data fastest processes the received data. This solves the problems, such as concentration of jobs to a specific information processing device, and realizes a quick data processing.

Further, the line concentrator, upon receipt of data addressed to the virtual address, refers to the group information table so as to identify a destination group to which the received data should be transmitted, and perform transmission of the data to information processing devices which belong to the identified group. That is, determination process of the line concentrator is extremely simple, so that it is possible to rapidly perform data transfer processing.

Here, for example, such an image output system has been conventionally suggested that the printer server determines a destination printer to which a print job is transferred. Such a system has the problem that it takes relatively much time for the printer server to perform determination process for the determination of the destination printer, as described above. Further, such a system requires the printer server to perform a relatively sophisticated determination process, thus causing the system to have a complex structure. This might cause the problem that a server goes down.

On the contrary, with a line concentrator according to the present invention, it is not necessary to provide the server for the printer server, and the process and function of the line concentrator itself are relatively simple. This can solve the problem associated with the system having the printer server.

Further, an information processing device according to the present invention is an information processing device which is connected via a transmission medium to the line concentrator according to the present invention, the information processing device comprising: storage means which stores device information indicating capability of the information processing device; and communication control means which, when said information processing device is connected to the line concentrator, performs controls so as to transmit the device information stored in the storage means to the line concentrator.

With this arrangement, for example, the line concentrator can divide the information processing devices into groups in accordance with the received device information, or with the arrangement in which device information is transmitted to the DHCP server, for example, via the line concentrator, the DHCP server can divide the information processing devices into groups in accordance with the device information.

Further, a DHCP server according to the present invention is a DHCP server which is connected via a transmission medium to the line concentrator according to the present invention, the DHCP server comprising: control means which controls operations performed in the DHCP server; and storage means which stores a group information table (i) classifying information processing devices connected to the line concentrator into groups according to capabilities of the information processing devices and (ii) listing IP addresses corresponding to the respective groups, the control means including DHCP processing means which, upon receipt of device information indicating capability of the information processing device connected to the line concentrator via the line concentrator from the information processing device, (a) determines a group to which the information processing device is to belong in accordance with the received device information, (b) sets an IP address corresponding to the determined group, (c) registers the information processing device with the group information table, and (d) performs controls so as to transmit the set IP address to the line concentrator.

Further, a DHCP processing method according to the present invention is a DHCP processing method performed by a DHCP server connected via a transmission medium to the line concentrator according to the present invention, the method comprising: the step of storing a group information table (i) classifying information processing devices connected to the line concentrator into groups according to capabilities of the information processing devices and (ii) listing IP addresses corresponding to the respective groups; and the step of, upon receipt of device information indicating capability of the information processing device connected to the line concentrator via the line concentrator from the information processing device, (a) determining a group to which the information processing device is to belong in accordance with the received device information, (b) setting an IP address corresponding to the determined group, (c) registering the information processing device with the group information table, and (d) performing controls so as to transmit the set IP address to the line concentrator.

With this arrangement, the DHCP server performs the grouping process in consideration of capabilities of the information processing devices, and it is not necessary for the line concentrator to perform such a process. This simplifies the structure of the line concentrator. For the line concentrator, it is not necessary to perform the process of converting an IP address assigned by the DHCP server into an internal IP address. This increases a speed of the transfer process performed by the line concentrator. Still further, it is not necessary for the line concentrator to have the arrangement for an address conversion process. This further simplifies the structure of the line concentrator.

Further, an information processing system according to the present invention includes: the line concentrator according to the present invention; and the information processing device according to the present invention connected via a transmission medium to the line concentrator.

According to this arrangement, a host which instructs information processing of data does not need to transmit data as a job addressing to a specific information processing device, but only needs to transmit data addressing to a virtual address corresponding to a group having the capability required for the execution of the job. This eliminates for the host the need to consider operating status of the information processing device to which the host instructs a job and other conditions.

Further, the line concentrator transfers received data to all of the information processing devices belonging to a group corresponding to a virtual address. Among the information processing devices having received the data, the information processing device which can process the received data fastest processes the received data. This solves the problems, such as concentration of jobs to a specific information processing device, and realizes a quick data processing.

Further, the line concentrator, upon receipt of data addressed to the virtual address, refers to the group information table so as to identify a destination group to which the received data should be transmitted, and perform transmission of the data to information processing devices which belong to the identified group. That is, determination process of the line concentrator is extremely simple, so that it is possible to rapidly perform data transfer processing.

Further, an information processing system according to the present invention includes: the line concentrator according to the present invention; the information processing device according to the present invention connected via a transmission medium to the line concentrator; and a DHCP server connected via a transmission medium to the line concentrator.

With this arrangement, the line concentrator converts the IP addresses of the respective information processing devices when they transmit/receive data. This conceals the IP addresses of the respective information processing devices from outside, thus improving security. The DHCP server can be a normal one having DHCP capability, and thus it is not necessary to provide a special DHCP server.

Further, an information processing system according to the present invention includes: the line concentrator according to the present invention, the information processing device according to the present invention connected via a transmission medium to the line concentrator, and a DHCP server according to the present invention connected via a transmission medium to the line concentrator.

With this arrangement, it is not necessary for the line concentrator to perform the grouping process in consideration of capabilities of the information processing devices, so that it is possible to simplify the structure of the line concentrator. Further, it is not necessary to perform the process of converting an IP address assigned by the DHCP server, for example, into an internal IP address. This increases a speed of the transfer process performed by the line concentrator. Still further, it is not necessary for the line concentrator to have the arrangement for address conversion process. This further simplifies the structure of the line concentrator.

Additional objects, features, and strengths of the present invention will be made clear by the description below. Further, the advantages of the present invention will be evident from the following explanation in reference to the drawings.

BRIEF DESCRIPTION OF DRAWINGS

FIG. 9 is a view illustrating an example of a VLAN table.

FIG. 10 is a view illustrating an example of an address conversion table.

FIG. 11 is a view illustrating an example of an address conversion table in Structural example 3.

FIG. 17 is a view illustrating an example of a VLAN table in Structural example 2.

FIG. 18 is a view illustrating an example of a VLAN table in Structural example 3.

BEST MODE FOR CARRYING OUT THE INVENTION

The following will describe one embodiment of the present invention with reference to FIGS. 1 through 18.

(Structure of Image Output System)

Figure 2:
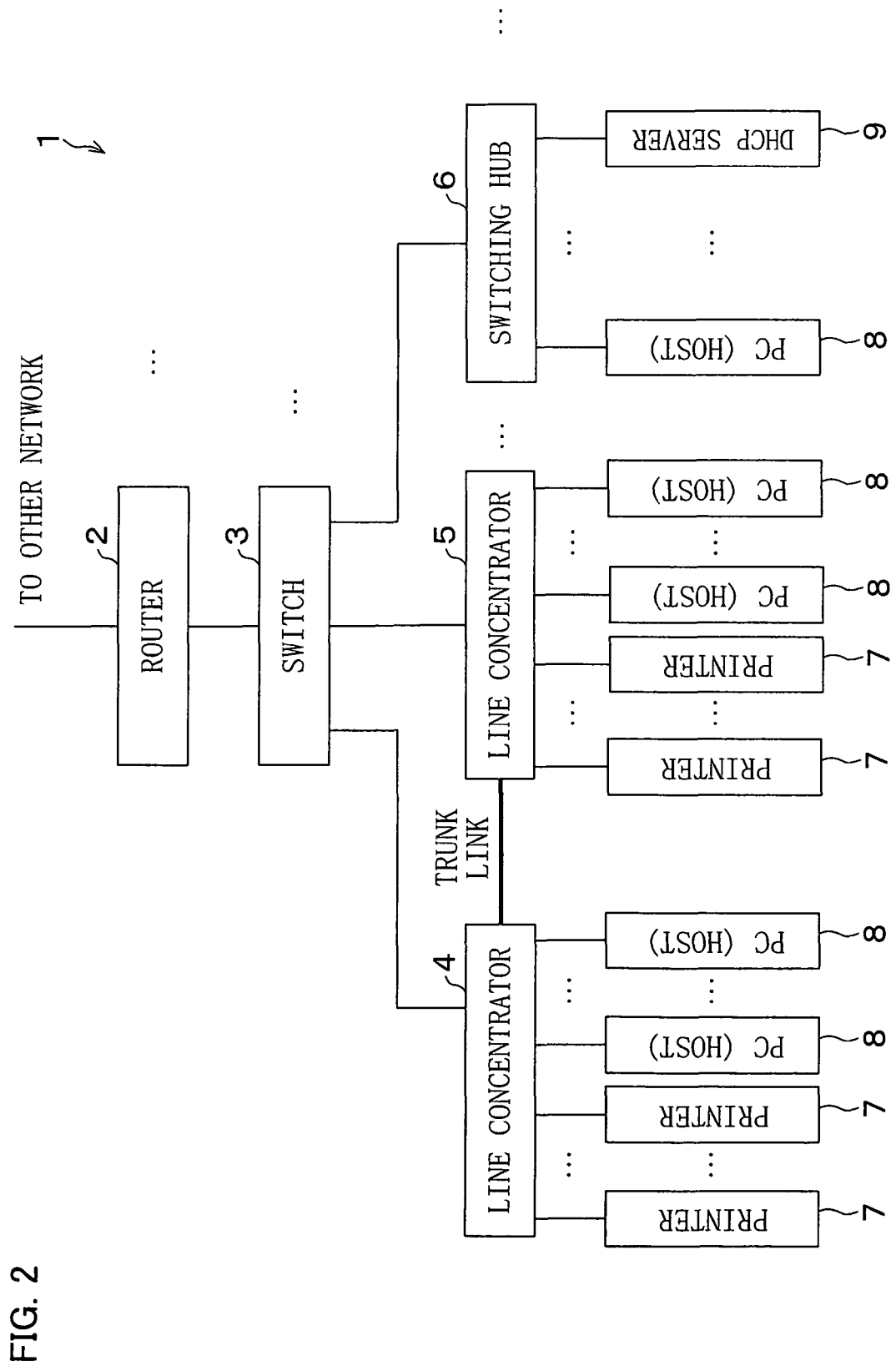
FIG. 2 is a block diagram schematically illustrating the structure of an image output system taken as a Structural example 1 according to the present embodiment.

FIG. 2 is a block diagram schematically illustrating an image output system 1 as Structural Example 1 according to the present embodiment. As illustrated in FIG. 2, the image output system 1 is realized by a star topology LAN having a router 2 at its center.

Cooperating with a switch 3, the router 2 controls communications of line concentrators 4 and 5 and a switching hub 6, which are connected to the switch 3. Further, the router 2 has the function of enabling the connection between the image output system 1 and an external communications network (network).

Each of the line concentrators 4 and 5 is arranged so as to allow for a star connection between a plurality of printers 7 and a plurality of PCs (hosts) 8. The switching hub 6 is arranged so as to allow for a star connection between a plurality of PCs 8 and a DHCP (Dynamic Host Configuration Protocol) server 9. Communications are performed by using TCP/IP (Transmission Control Protocol/Internet Protocol) protocol.

Receiving a print job, the printer 7 prints an image according to the print job on a medium, such as paper, and outputs the medium. Apart from a printer having a normal printing capability, the printer 7 may be an MFP or the like.

The PC 8 corresponds to an information processing terminal which performs various information processing. The PC 8 transmits a print job to the line concentrator 4 or 5 according to a printing instruction given from a user. The PC 8 is assumed to be, for example, a desktop computer or a notebook computer. Note that, the present embodiment assumes that the PC 8 is a host which outputs a print job instruction. However, the present embodiment is not limited to this. The host may be any apparatus, provided that it is an apparatus capable of providing the print job instruction.

The DHCP server 9 is a server which performs automatic settings of a network parameter. In the present embodiment, the DHCP server 9 performs automatic settings of a network parameter of each communications device in the image output system 1, i.e. each communications device communications of which are controlled by the router 2. Specifically, the DHCP server 9 dynamically assigns an IP address to each communications device upon startup, notifies a network parameter like a default route, and collects the assigned IP address at the end. In the present embodiment, the DHCP server 9 is connected to the switching hub 6. However, the present embodiment is not limited to this arrangement. The DHCP server 9 may be networked at any position, provided that it is in the LAN where communications are controlled by the router 2.

The line concentrator 4 and the line concentrator 5 are connected to each other by means of a trunk link (link). The trunk link, which differs from a configuration in which one VLAN (details thereof will be described later) is allocated to one port (access link), is a connection of ports configured to carry traffic of multiple VLANs between connected devices. The ports do not belong to a particular VLAN. As a matter of course, a random transfer of traffic of multiple VLANs causes the following problem: A switch having received a frame cannot identify which VLAN traffic the received frame derives from. In view of this, a tag is attached to each frame at the entrance of a trunk by using a tagging protocol (e.g. ISL and IEEE802.3Q), and the attached tag is removed at the exit of the trunk. In such a manner, carrying traffic of multiple VLANs becomes possible. Further, under the circumstances where a VTP operates on the trunk link, change to a network parameter regarding VLAN on one line concentrator is propagated to the other line concentrator. That is, in the arrangement in which the line concentrator 4 and the line concentrator 5 are connected to each other by means of a trunk link, various devices connected to the line concentrator 4 and the line concentrator 5 can be regarded as being all virtually connected to one line concentrator. Considering this, the following descriptions simply refer to the line concentrator 4 and the line concentrator 5 as the line concentrator 4, unless a distinction between the line concentrator 4 and the line concentrator 5 is necessary.

Note that, also in a case where there exist three or more such line concentrators, all the line concentrators are aggregated by being connected to one another by means of a trunk link. This makes it possible to assume the line concentrators to be one virtual line concentrator.

(Grouping into VLANs)

Next, the VLAN (Virtual Local Area Network) controlled by the line concentrators 4 and 5 will be described below with reference to FIG. 3. First of all, the VLAN is described. The VLAN is a virtual LAN which eliminates limitations on a physical structure of the LAN and is realized by grouping various devices connected to the LAN according to their usage or the like. The construction of the VLAN allows devices physically distanced but having the same capability, usage and/or the like to be arranged in one VLAN, and conversely allows devices physically close to each other but having mutually different capabilities, usages and/or the like to be arranged in different VLANs.

Figure 3:
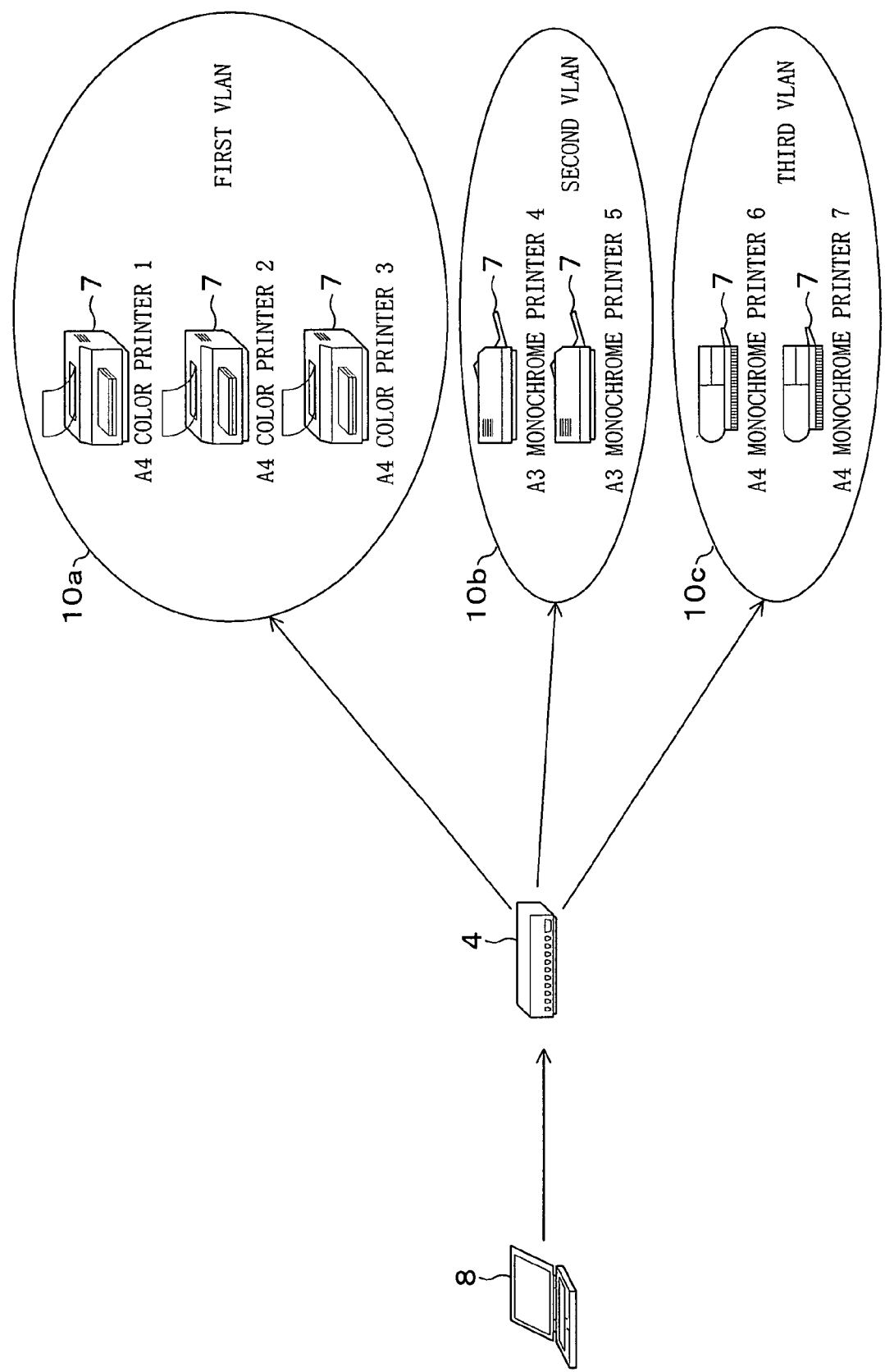
FIG. 3 is a view schematically illustrating the state where a line concentrator, a PC, and a plurality of printers are connected to one another.

FIG. 3 schematically illustrates the state where the line concentrator 4, the PC 8, and the plurality of printers 7 are connected to one another. Here, the printers 7 are grouped according to their capabilities into a first VLAN 10a, a second VLAN 10b, and a third VLAN 10c. In this example, the printers 7 having the color printing capability and the A4-paper outputting capability belong to the first VLAN 10a. The printers 7 having the monochrome printing (colorless printing) capability and the A3-paper outputting capability belong to the second VLAN 10b. The printers 7 having the monochrome printing (colorless printing) capability and the A4-paper outputting capability belong to the third VLAN 10c. Note that, the printers 7 included in one VLAN may be physically distanced in an actual system.

Figure 4:
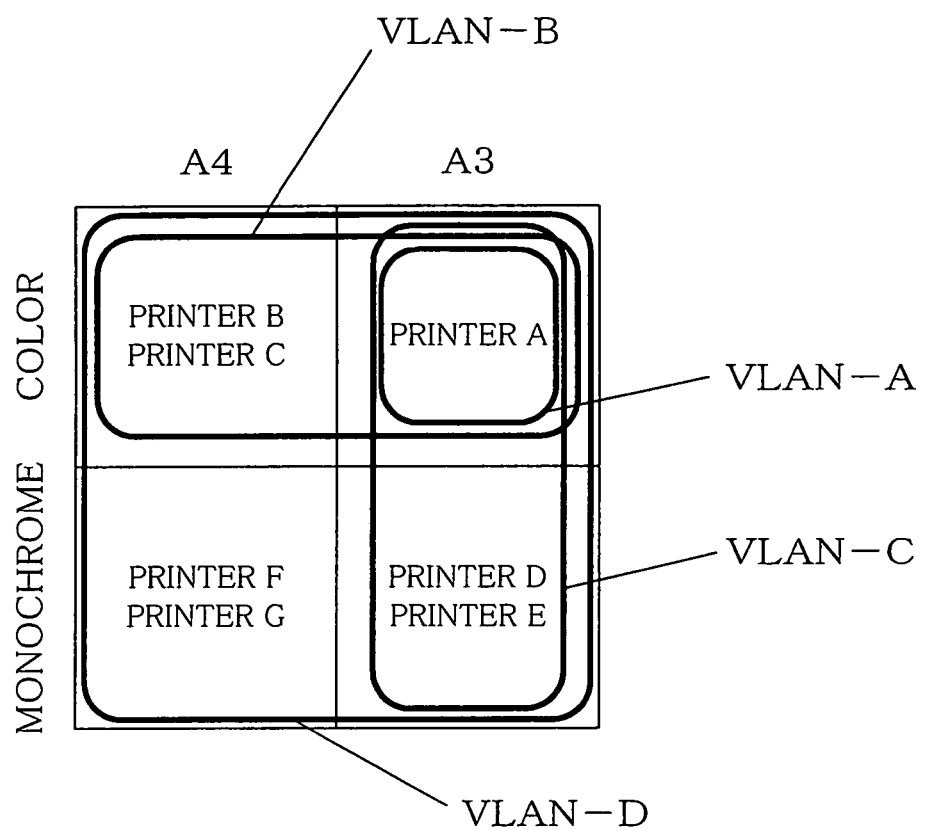
FIG. 4 is a diagram conceptually illustrating grouping into VLANs.

In the example illustrated in FIG. 3, each of the printers 7 belongs to any one of VLANs. However, the present embodiment is not limited to this. One printer 7 may belong to a plurality of VLANs at the same time. FIG. 4 is a diagram conceptually illustrating grouping into VLANs. In FIG. 4, a printer A has the A3-paper outputting capability and the color outputting capability. Printers B and C have the A4-paper outputting capability and the color outputting capability. Printers D and E have the A3-paper outputting capability and the monochrome printing (colorless printing) capability. Printers F and G have the A4-paper outputting capability and the monochrome printing (colorless printing) capability.

To a VLAN-A, the printer having the A3-paper outputting capability and the color outputting capability, i.e. a printer A alone belongs. To a VLAN-B, the printers having the color putting capability, i.e. printers A, B, and C belong. To a VLAN-C, the printers having the A3-paper outputting capability, i.e. printers A, D, and E belong. To a VLAN-D, all the printers, i.e. printers A, B, C, D, E, F, and G belong. With such VLANs, by determining a VLAN according to capabilities required for a print job, it is possible to include all printers supporting the required capabilities.

Note that, as parameters indicating capabilities of the printer 7, the following two parameters: supported paper size (A3/A4) and the number of colors outputted (color/monochrome) have been taken in the above example. However, the present embodiment is not limited to this arrangement. For example, grouping the printers 7 into VLANs may be carried out by using parameters such as whether the printer 7 has the double-sided printing capability and whether the printer 7 has the finishing capabilities such as stapling.

(Outline of the Process in the Image Output System)

Next, with reference to FIG. 3, the following will describe the outline of the processes in the image output system 1 of the present embodiment. First of all, when the user makes a print request by means of the PC 8, the PC 8 designates, as a destination address, a virtual address of a VLAN organizing printers 7 having the capabilities required for the print request, so as to transmit data corresponding to a print job to the line concentrator 4.

Upon receipt of the print job addressed to the virtual address, the line concentrator 4 broadcasts the print job to the VLAN corresponding to the virtual address. That is, the print job is transmitted to all of the printers 7 belonging to the VLAN constituted by the printers 7 having the capabilities required for the print job.

When one of the printers 7 having received the print job initiates the print job, the initiation of the print job is notified to the line concentrator 4. Upon receipt of the print job initiation notification, the line concentrator 4 makes a request for suspending the initiation of that print job to the printers 7, except for the printer 7 having initiated the print job, among the printers 7 to which the line concentrator 4 has transmitted the print job. This prevents the plurality of printers 7 from concurrently executing one print job.

However, in the above process, in order for the request for suspending the initiation of that print job to reach the printers 7, except for the printer 7 having initiated the print job, among the printers 7 to which the line concentrator has transmitted that print job, unicasting to the printers must be carried out. Thus, the volume of traffic caused corresponds to the number of printers. In view of this, if the printer 7 having initiated the print job broadcasts the initiation notification to the VLAN which such a printer 7 belongs to, it is possible to obtain the same effect as the aforesaid case brings and to drastically reduce the traffic.

Also, when the printer 7 having initiated the print job completes the print job, the completion of the print job is notified to the line concentrator 4. Upon receipt of the print job completion notification, the line concentrator 4 makes a request for canceling the print job concerned to the printers 7, except for the printer 7 having completed the print job, among the printers 7 to which the line concentrator 4 has transmitted the print job.

As in the case of the initiation notification, in the above process, in order for the request for canceling that print job to reach the printers 7, except for the printer 7 having completed the print job, among the printers 7 to which the line concentrator has transmitted that print job, unicasting to the printers must be carried out. Thus, the volume of traffic caused corresponds to the number of printers. In view of this, if the printer 7 having completed the print job broadcasts the completion notification to the VLAN which the concerned printer 7 belongs to, it is possible to obtain the same effect as the aforesaid case brings and to drastically reduce the traffic.

More specifically, the printers 7 other than the printer 7 executing the print job cause such print job to be pending at the time when the other printer 7 initiates the print job, and cancel such print job at the time when the other printer 7 completes the print job. With this arrangement, even if the printer having initiated the print job fails to complete printing due to any trouble, another printer can initiate such a pending print job.

As described above, when a print job is transmitted from the PC 8, printing is performed by the printer 7 capable of performing printing fastest among the printers of the VLAN that is to respond to such a print job. In this case, the line concentrator 4 broadcasts the print job to the VLAN corresponding to the virtual address. This eliminates the need for a complicated judgment or the like. As such, it is possible to realize the line concentrator 4 with a relatively simple configuration, and to shorten a processing time for relaying the print job. Further, such a print job is not transmitted to any printers 7 other than the printers 7 belonging to the VLAN that is to respond to the print job. This reduces the volume of traffic on the communications network.

(Structure of the Line Concentrator)

Figure 1:
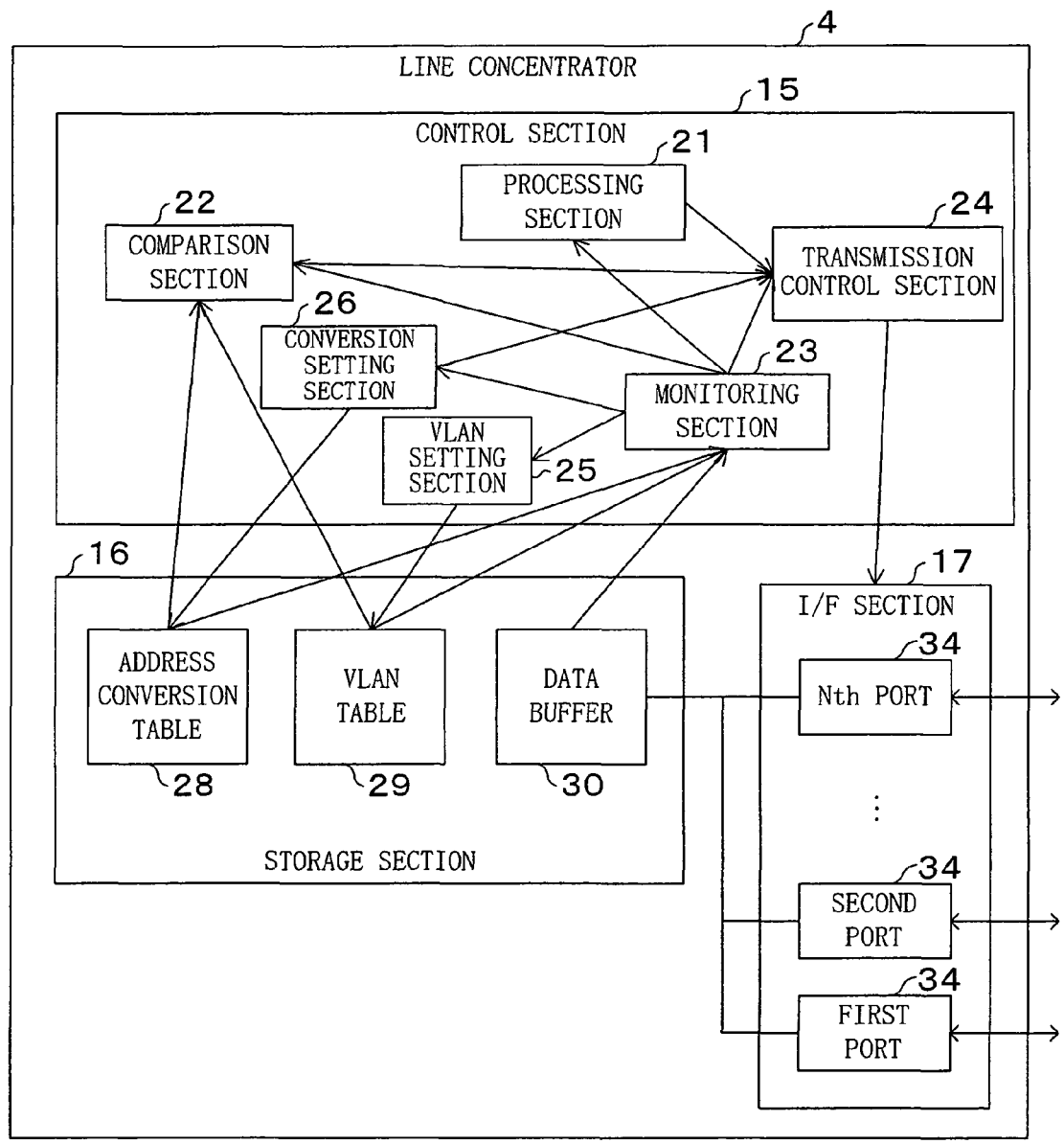
FIG. 1 is a block diagram schematically illustrating the structure of a line concentrator included in an image output system according to one embodiment of the present invention.

Next, the structure of the line concentrator 4 will be described below with reference to FIG. 1. As illustrated in FIG. 1, the line concentrator 4 includes a control section 15, a storage section 16, and an I/F section 17.

The I/F section 17 includes first to Nth ports 34 and serves as an interface for connection to external devices such as the printers 7, the PCs 8, the line concentrator 5, and the switch 3.

The control section 15 includes the following functional blocks: a processing section 21; a comparison section 22; a monitoring section 23; a transmission control section 24; a VLAN setting section 25; and a conversion setting section 26.

The monitoring section 23 monitors data having been received by the I/F section 17 to determine whether updating of a VLAN table 29 is required, whether updating of an address conversion table 28 is required, and whether the received data must be transferred or subjected to various processes. As a result of the determination, the monitoring section 23 transmits the data to the VLAN setting section 25, the conversion setting section 26, the comparison section 22, or the processing section 21, or instructs the transmission control section 24 to perform an appropriate transmission process. The data received by the I/F section 17 is temporarily stored in a data buffer 30 of the storage section 16. Accordingly, the monitoring section 23 monitors the data stored in the data buffer 30.

The VLAN setting section 25, when devices (PC 8, printer 7, and others) are connected to the ports of the I/F section 17, performs updating and setting of the VLAN table that stores information regarding the connected devices. Details of the VLAN table 29 and details of the settings by the VLAN setting section 25 will be described later.

When IP address is configured by the DHCP server 9 to the device connected to the line concentrator 4, the conversion setting section 26 performs the process of setting the address conversion table 28 for converting the IP address into an internal IP address corresponding to a subnet address of the VLAN to which the connected device belongs. FIG. 10 illustrates an example of the address conversion table 28. As illustrated in FIG. 10, the address conversion table 28 stores a combination of (i) an IP address assigned by the DHCP server 9 and (ii) an internal IP address assigned by the conversion setting section 26. Details of the settings by the conversion setting section 26 will be described later.

Referring to the VLAN table 29 and/or the address conversion table 28, the comparison section 22 performs transmission instruction after having performed an operation such as IP address conversion. The processing section 21 performs various operations of the line concentrator 4.

The transmission control section 24 controls transmissions of various data instructed by the monitoring section 23, the conversion setting section 26, the comparison section 22, or the processing section 21. The control by the transmission control section 24 is performed with respect to the I/F section 17. Under the control of the transmission control section 24, the I/F section 17 transmits data temporarily stored in the data buffer.

(Structure of Printer)

Figure 5:
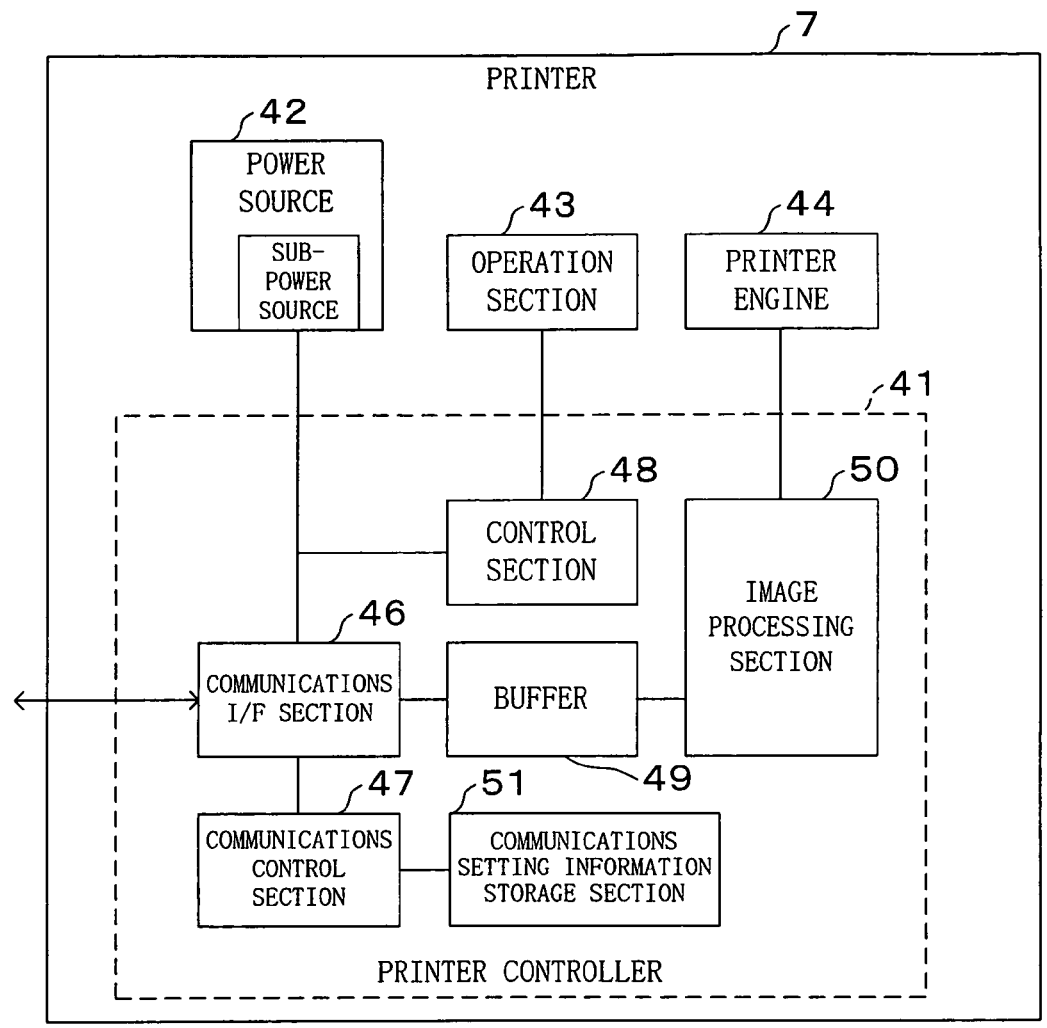
FIG. 5 is a block diagram schematically illustrating the structure of a printer.

Next, the structure of the printer 7 will be described below with reference to FIG. 5. As illustrated in FIG. 5, the printer 7 includes a printer controller 41, a power source 42, an operation section 43, and a printer engine 44.

The printer controller 41 includes a communications I/F section 46, a communication control section 47, a control section 48, a buffer 49, an image processing section 50, and a communications setting information storage section 51. The communications I/F section 46 serves as an interface for connection to the line concentrator 4 or other devices.

The communication control section 47 controls communications of the printer 7. The communication control section 47 performs operations such as transmission of device information, which is performed when the printer 7 is connected to the line concentrator 4 for the first time, transmission of DHCPDISCOVER to the DHCP server 9, reception of DHCPOFFER from the DHCP server 9, reception of print job data, notification of printing initiation, notification of printing completion, notification of the occurrence of abnormal condition, and notification of recovery from the abnormal condition. Details of these operations will be described later. The communications setting information storage section 51 stores various setting information used in communications, for example, configuration information such as MAC address information of the printer 7, device information, and IP address information.

The control section 48 controls various operations of the printer 7. The buffer 49 is storage means which temporarily stored data transmitted/received to/from the communications I/F section 46. The image processing section 50 performs conversion of data received as a print job into image data suitable for printing.

The power source 42 supplies power to the components of the printer 7. The power source 42 includes a sub-power source. The sub-power source enables continuous supply to the communications I/F section 46 and the communication control section 47. More specifically, s power-saving system can be constructed such that in normal condition, power supply to only the communications I/F section 46 and the communication control section 47 is performed by the sub-power source, and power supply to the entire printer 7 is selectably performed according to the nature of communications.

The operation section 43 is used for user's entry of conditions for image forming and for various settings. The printer engine 44 outputs images on media, such as paper, for printing.

(VLAN Table)

Next, the VLAN table 29 included in the line concentrator 4 is described. FIG. 9 illustrates an example of the VLAN table 29. As illustrated in FIG. 9, the VLAN table 29 stores, for each device, the following sets of information: a virtual MAC address; a MAC address; port information; device information; VLAN number; and a subnet address.

The virtual MAC address is a virtual MAC address configured for each VLAN. In issuing a print job instruction, the PC 8 designates the virtual MAC address as a destination for data transmission.

The MAC address is a MAC (Media Access Control) address configured for a device connected to the line concentrator 4. The port information indicates which port in the I/F section 17 of the line concentrator 4 the device is connected to.

The device information indicates the capability of the device connected to the line concentrator 4. When the connection between the line concentrator 4 and the device connected to the line concentrator 4 becomes active, the device information is configured according to information transmitted from the device connected to the line concentrator 4. As described previously, the VLAN is configured according to the device information indicating the capability of each device.

The VLAN number indicates a number unique to the VLAN which the device connected to the line concentrator 4 belongs to. The subnet address is a subnet address indicating the VLAN which the device connected to the line concentrator 4 belongs to. In FIG. 9, the subnet address is represented by "192.168.11.0/24", for example. "24", the last number in the sets of numbers, indicates that high 24 bits (3 byte) are used for the subnetwork address. That is, low 8 bits (1 byte) are used for the IP address of each device on the same VLAN.

In an example illustrated in FIG. 9, the printers 7 respectively having MAC addresses 1 through 3 belong to the first VLAN and are assigned a virtual MAC address A. The printers 7 respectively having MAC addresses 4 and 5 belong to the second VLAN and are assigned a virtual MAC address B. The printers 7 respectively having MAC addresses 6 and 7 belong to the third VLAN and are assigned a virtual MAC address C.

A device having a MAC address a is the PC 8, and device information of the PC 8 is represented by the attribute "host". Further, the VLAN table 29 stores MAC address of the line concentrator 4 itself (own MAC address), and device information of the line concentrator 4 is represented by the attribute "own".

In the present embodiment, the VLANs are constructed according to the capabilities of the printers 7, so that the printers 7 are grouped into the VLANs. However, the present embodiment is not limited to this arrangement. More specifically, the printers 7 may be grouped by using a table that associates the virtual MAC addresses with MAC addresses or IP addresses of the printers, without using the VLANs. Such an arrangement that no VLANs are included raises no problem in a small-size system, but raises the problem of traffic congestion in a large-size system.

(Initial Setting Process)

Figure 6:
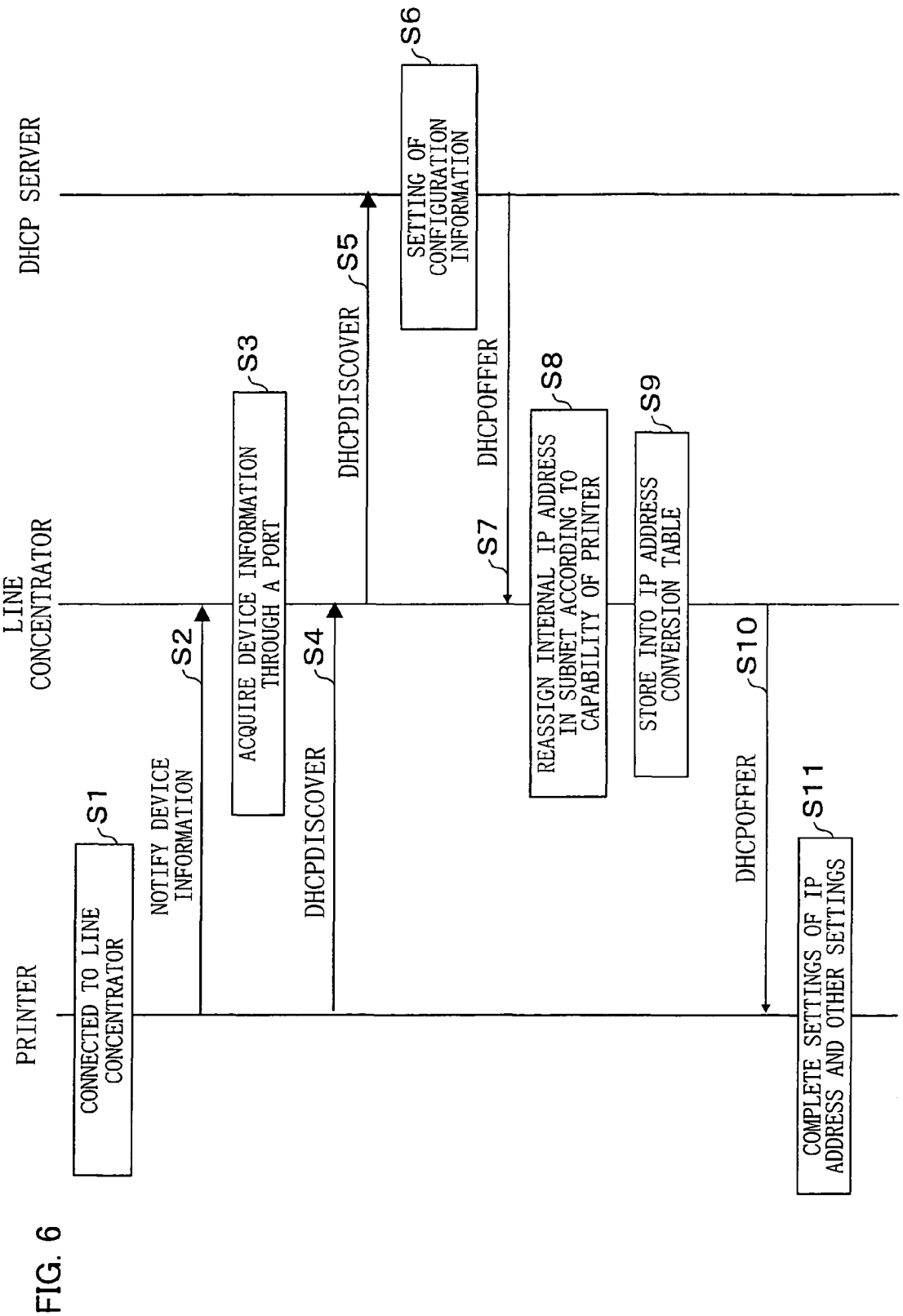
FIG. 6 is a timing chart illustrating the flow of initial setting process performed at the time when the printer is connected to the line concentrator.

Next, initial setting process performed at the time when the printer 7 is connected to the line concentrator 4 will be described with reference to a timing chart illustrated in FIG. 6. First of all, one printer 7 is connected to the line concentrator 4 (Step 1; hereinafter "step" will be abbreviated to "S"). Then, under the communication control section 47 of the printer 7, device information indicating the capability of the printer 7, which is stored in the communications setting information storage section 51, is transmitted from the printer 7 to the line concentrator 4 (S2). In S1, the connection between the printer 7 and the line concentrator 4 is established in such a manner that a communications line is physically connected therebetween, that power to the printer 7 is turned on in the state where the communications line is connected therebetween, or other manner.

In the line concentrator 4, when the port 34 of the I/F section 17, which is connected to the printer 7, receives device information (S3), the received data is stored in the data buffer 30. Then, the monitoring section 23 detects the data having been stored in the data buffer 30, confirms that such data is data indicating device information, and then transmits this information to the VLAN setting section 25.

The VLAN setting section 25 determines which VLAN the printer 7 should belong to from the received device information. The VLAN setting section 25 registers, in the VLAN table 29, a virtual MAC address corresponding to the VLAN which the printer 7 is to belong to, a MAC address of the printer 7, port information of the port to which the printer 7 is connected, device information, VLAN number of the VLAN which the printer 7 is to belong to, and a subnet address corresponding to the VLAN which the printer 7 is to belong to.

The printer 7 notifies the line concentrator 4 of its device information. Thereafter, the printer 7 transmits DHCPDISCOVER to the line concentrator 4 (S4). The DHCPDISCOVER is a message which is broadcasted by a client (i.e. the printer 7) to discover the DHCP server 9.

In the line concentrator 4 having received the DHCPDISCOVER from the printer 7, the DHCPDISCOVER is transmitted from the I/F section 17 to the data buffer 30, and the monitoring section 23 confirms that the received data is DHCPDISCOVER. Confirming the DHCPDISCOVER, the monitoring section 23 instructs the transmission control section 24 to broadcast the DHCPDISCOVER to the communications network. Alternatively, if the line concentrator recognizes an address of the DHCP server, the DHCPDISCOVER may be delivered to that address by using unicasting. If the line concentrator functions as a DHCP relay agent, the DHCPDISCOVER may be transferred to only an appropriate LAN by using broadcasting. In such a manner, the DHCPDISCOVER is transferred to the DHCP server 9 (S5).

Upon receipt of the DHCPDISCOVER, the DHCP server 9 performs the settings of configuration information such as a network parameter according to the contents of the DHCPDISCOVER (S6). Then, in response to the DHCPDISCOVER, the result of the settings is transmitted to the line concentrator 4 in the form of DHCPOFFER including the configuration information (S7).

Upon receipt of the DHCPOFFER, the line concentrator 4 stores the DHCPOFFER into the data buffer 30. When having detected the DHCPOFFER, the monitoring section 23 transmits this information to the conversion setting section 26.

The conversion setting section 26 confirms the IP address shown in the DHCPOFFER and having been configured to the printer 7 by the DHCP server 9. Further, the conversion setting section 26 confirms the subnet address of the printer 7, referring to the VLAN table 29. Then, the conversion setting section 26 sets the IP address belonging to the subnet address, as the internal IP address of the printer 7 (S8). Subsequently, the conversion setting section 26 registers, into the address conversion table 28, information regarding a combination of the IP address shown in the DHCPOFFER and the internal IP address (S9).

Thereafter, the conversion setting section 26 replaces information regarding the IP address in the DHCPOFFER with the above-set internal IP address, and then transmits the DHCPOFFER to the printer 7 (S10).

In the printer 7, when the communications I/F section 46 receives the DHCPOFFER, the configuration information, such as the internal IP address, included in the DHCPOFFER is stored by the communication control section 47 into the communications setting information storage section 51 (S11). Through the aforementioned process, the initial setting process performed when the printer 7 is connected to the line concentrator 4 is completed.

Note that, in the above descriptions, the device information is acquired from the printer 7 connected. However, the present embodiment is not limited to this. For example, in the case where there is provided a printer server which stores device information of each printer 7, the present embodiment may be arranged such that device information regarding the printer 7 connected may be acquired from the printer server.

(Operations in the Line Concentrator)

Next, the flow of the process performed when the line concentrator 4 receives a frame over the communications network will be described with reference to a flowchart illustrated in FIG. 12.

First, when the I/F section 17 receives a frame (S21), the frame is temporarily stored in the data buffer 30. Then, the monitoring section 23 analyzes the frame and extracts a MAC address as a sender's address, to determine whether the sender's address has been stored (registered) in the VLAN table 29 (S22).

In S22, if it is determined that the sender's address has not been stored (registered) in the VLAN table 29, such determination is notified to the VLAN setting section 25. The VLAN setting section 25 registers, into the VLAN table 29, (i) the MAC address as the sender's address and (ii) port information regarding the port 34 having received the frame (S23). Here, in the case when the received frame is device information notification from the printer 7, the above-mentioned initial setting process is performed. Thereafter, the process moves to S26 as will be described later.

On the other hand, in S22, if it is determined that the sender's address has been stored (registered) in the VLAN table 29, the monitoring section 23 determines if there is a match between the sender's address of the transmitted frame and the MAC address of the printer 7 registered in the VLAN table 29 (S24). In other words, the monitoring section 23 determines whether the frame has been transmitted from the printer 7 registered in the VLAN table 29.

In S24, if it is determined that the sender's address matches the MAC address of the printer 7 registered in the VLAN table 29, such determination is notified to the comparison section 22. The comparison section 22 refers to the address conversion table 28 so as to replace the sender's address of the frame with an IP address as an external IP address (S25). Thereafter, the process moves to S26 as will be described later.

On the other hand, in S24, if it is determined that the sender's address is not the MAC address of the printer 7 registered in the VLAN table 29, the process moves to S26.

Next, the monitoring section 23 analyzes the frame and extracts a destination address (S26), and determines a destination of the frame from the extracted destination address. Specifically, the monitoring section 23 determines whether the destination address of the frame is an unknown address which has not been registered in the VLAN table 29, a known MAC address which has been registered in the LAN table 29, virtual MAC address, or own MAC address of the line concentrator.

In S26, if it is determined that the destination address is an unknown address, the monitoring section 23 instructs the transmission control section 24 to perform transmissions (flooding) of the frame to all the ports 34, except for the port 34 to which the frame has been transmitted. According to this instruction, the transmission control section 24 performs transmissions (S27) and then completes the process. The flooding is to transmit a traffic having been received through a certain interface to all the interfaces except for the interface having received the frame. However, in such a case, the frame is transmitted to all of the ports 34, except for (i) the port 34 having received the frame and (ii) the ports 34 to which the printers 7 are connected.

In S26, if it is determined that the destination address is a known MAC address having been registered in the VLAN table 29, the monitoring section 23 refers to the VLAN table 29 to instruct the transmission control section 24 to transmit the frame to such a known MAC address. According to the instruction, the transmission control section 24 performs transmission (S29), and the process is completed.

In S26, if it is determined that the destination address is a virtual MAC address, printer selecting process is performed (S28). Details of the printer selecting process will be described later. Thereafter, the frame is transmitted to the selected printer 7 (S29).

In S26, if it is determined that the destination address is the address of the line concentrator, such determination is notified to the processing section 21. The processing section 21 restores data from the frame addressed to the line concentrator so as to analyze the contents of the frame, and then determines whether the data indicates a setting change request (S30).

In S30, if it is determined that the data indicates the setting change request, the processing section 21 updates the setting of the line concentrator 4 according to the setting change request (S31). Specifically, the processing section 21 changes the virtual MAC address stored in the VLAN table 29 or changes the address of the line concentrator. Then, the process is completed.

On the other hand, in S30, if it is determined that the data is not the setting change instruction, the processing section 21 determines whether the data is a notification from the printer 7 (S32). In S32, if it is determined that the data is the notification from the printer 7, the processing section 21 performs the operation in response to such notification (S33). The operation performed in response to the notification will be described later. On the other hand, in S32, if it is determined that the data is not the notification from the printer 7, the processing section 21 performs an appropriate operation according to the contents of the data (S34), and the process is completed.

(Printer Selecting Process)

Next, details of S28 of the flowchart illustrated in FIG. 12, i.e. the printer selecting process will be described with reference to a flowchart illustrated in FIG. 13. First of all, in S41, when it is confirmed that the frame addressed to the virtual MAC address has been received, the monitoring section 23 determines whether the received frame is a frame indicating a print request (S42).

In S42, if it is determined that the received frame is a frame indicating a print request, the monitoring section 23 refers to the VLAN table 29 to identify a VLAN corresponding to the virtual MAC address, and instructs the transmission control section 24 to broadcast such a frame to all of the printers 7 belonging to the identified VLAN. With this, the received print job is transmitted to all of the printers 7 belonging to the VLAN concerned (S43), and the process is completed.

On the other hand, in S42, if it is determined that the received frame is not a frame indicating a print request, such determination is notified to the processing section 21. The processing section 21 determines the contents of the frame and performs an appropriate operation according to the contents of the frame (S44), and the process is completed. Examples of the appropriate operation include a reply to an inquiry from the PC 8 as a host about wait time information of the printer 7 and an operation performed in response to a request, from the PC 8, for giving a higher priority to a print job that the PC 8 has instructed for printing.

(Operations Performed in Response to Notification from the Printer)

Figure 14:
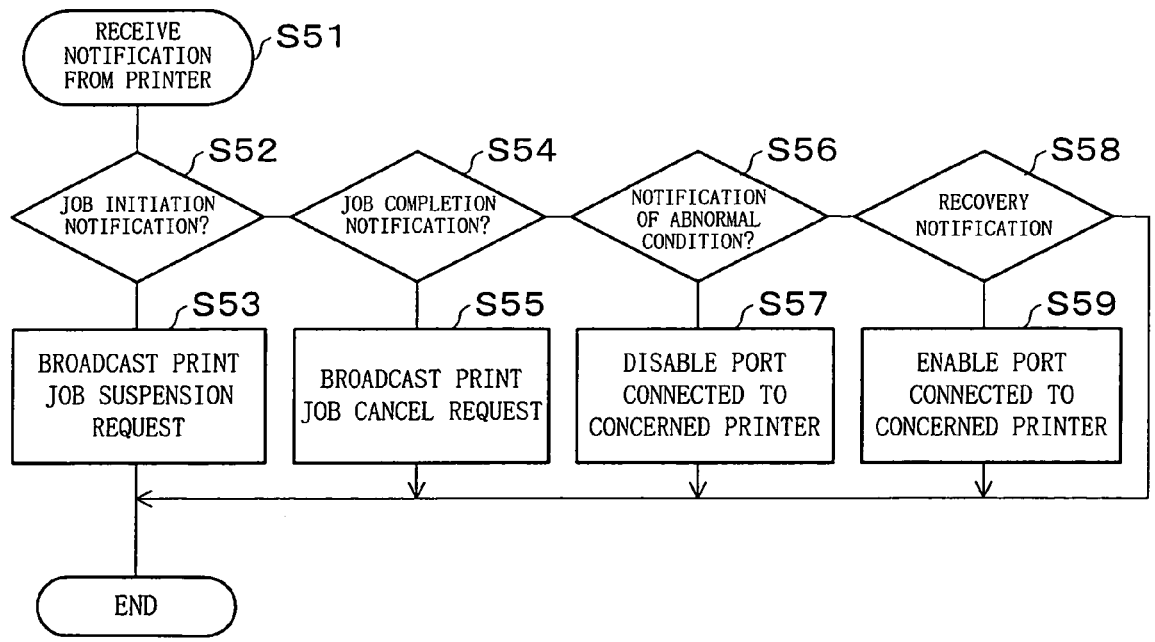
FIG. 14 is a flowchart illustrating the flow of a process performed in response to notification from the printer.

Next, details of S33 of the flowchart illustrated in FIG. 12, i.e. the operations performed in response to the notification from the printer 7 will be described with reference to a flowchart illustrated in FIG. 14. First of all, in S51, when the receipt of the notification from the printer 7 is confirmed, the processing section 21 determines whether the received notification is a notification indicating the initiation of a print job (S52).

In S52, if determining that the notification is the one indicating the initiation of a print job, the processing section 21 controls the transmission control section 24 so that the transmission control section 24 makes a print job suspension request to the printers 7, except for the printer 7 having initiated the print job, among the printers 7 belonging to the VLAN to which such a print job has transmitted (S53).

On the other hand, in S52, if determining that the notification is not the one indicating the initiation of a print job, the processing section 21 determines whether the notification is the one indicating the completion of a print job (S54). In S54, if determining that the notification is the one indicating the completion of a print job, the processing section 21 controls the transmission control section 24 so that the transmission control section 24 makes a print job cancel request to the printers 7, except for the printer 7 having completed the print job, among the printers 7 belonging to the VLAN to which such a print job has been transmitted (S55).

On the other hand, in S54, if determining that the notification is not the one indicating the completion of a print job, the processing section 21 determines whether the notification is the one indicating the occurrence of abnormal condition in the printer 7 (S56). In S56, if determining that the notification is the one indicating the occurrence of abnormal condition, the processing section 21 makes an instruction for causing the port 34 having received the notification to be disabled (S57). In causing the port 34 to be disabled, the settings for the disabled port 34 in the VLAN table 29 are saved. Causing the port 34 to be disabled means that the printer 7 connected to the disabled port 34 loses its membership from the VLAN. In other words, the printer 7 having lost the membership cannot communicate with the line concentrator 4, after which no print job is transmitted to the printer 7 having lost the membership even if a print job is broadcasted to the VLAN which the printer 7 having lost the membership belongs to.

On the other hand, in S56, if determining that the notification is not the one indicating the occurrence of abnormal condition, the processing section 21 determines whether the notification is a recovery notification indicating a recovery of the printer 7 having occurred the abnormal condition therein from such abnormal condition (S58). In S58, if determining that the notification indicates the recovery notification, the processing section 21 reinstates the settings, saved in the VLAN table 29, for the port 34 having received the recovery notification, and makes an instruction for causing such a port 34 to be enabled (S59). Causing the port 34 to be enabled means that the port 34 recovers its membership of the VLAN and that the corresponding printer 7 recovers its membership of the same VLAN. Subsequently, a printer job is transmitted to the printer 7 when the print job is broadcasted to the VLAN.

(Structural Example 2 of the Image Output System)

In the above system, the VLAN is realized in such a manner that the line concentrator 4 converts the external IP address assigned by the DHCP server 9 to each of the printers 7 into the internal IP address. However, the system may be the one in which the DHCP server 9 determines the assignment of the IP address to each of the printers 7 in consideration of the VLAN. Such an image output system 1 is described as Structural example 2 below.

The structure of the image output system 1 is similar to the structure illustrated in FIGS. 2 and 3, except for the structure of the line concentrator 4 and the structure of the DHCP server 9.

(Structure of the Line Concentrator in Structural Example 2)

Figure 15:
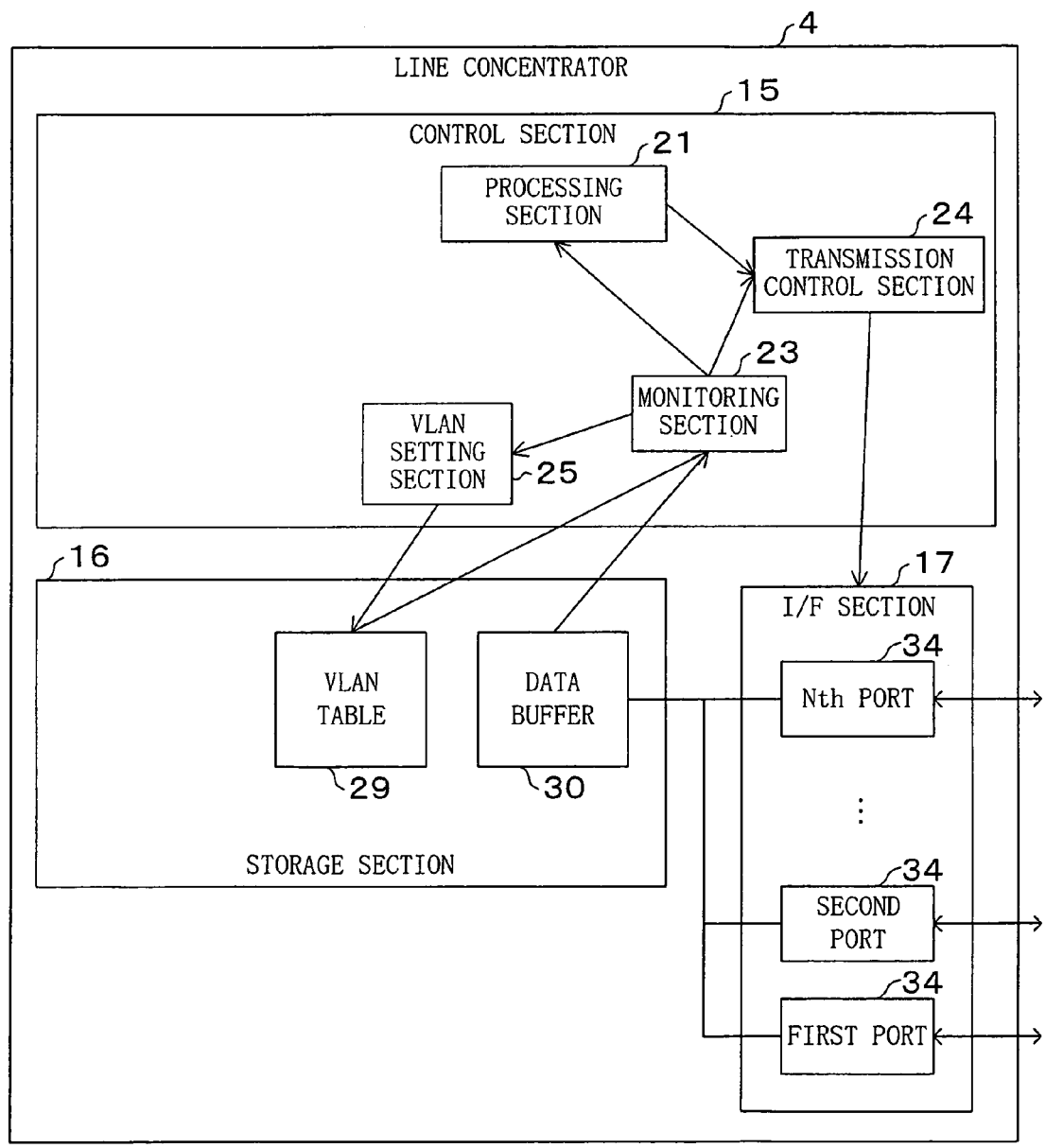
FIG. 15 is a block diagram schematically illustrating the structure of the line concentrator in Structural example 2.

FIG. 15 illustrates the structure of the line concentrator 4 in Structural example 2. The structure of the line concentrator 4 in Structural example 2 is different from the structure of the line concentrator 4 illustrated in FIG. 1 in that the control section 15 does not include the comparison section 22 and the conversion setting section 26 and that the storage section 16 does not include the address conversion table 28. The other components are the same as those in the above system, and explanations thereof are omitted.

(Structure of DHCP Server in Structural Example 2)

Figure 16:
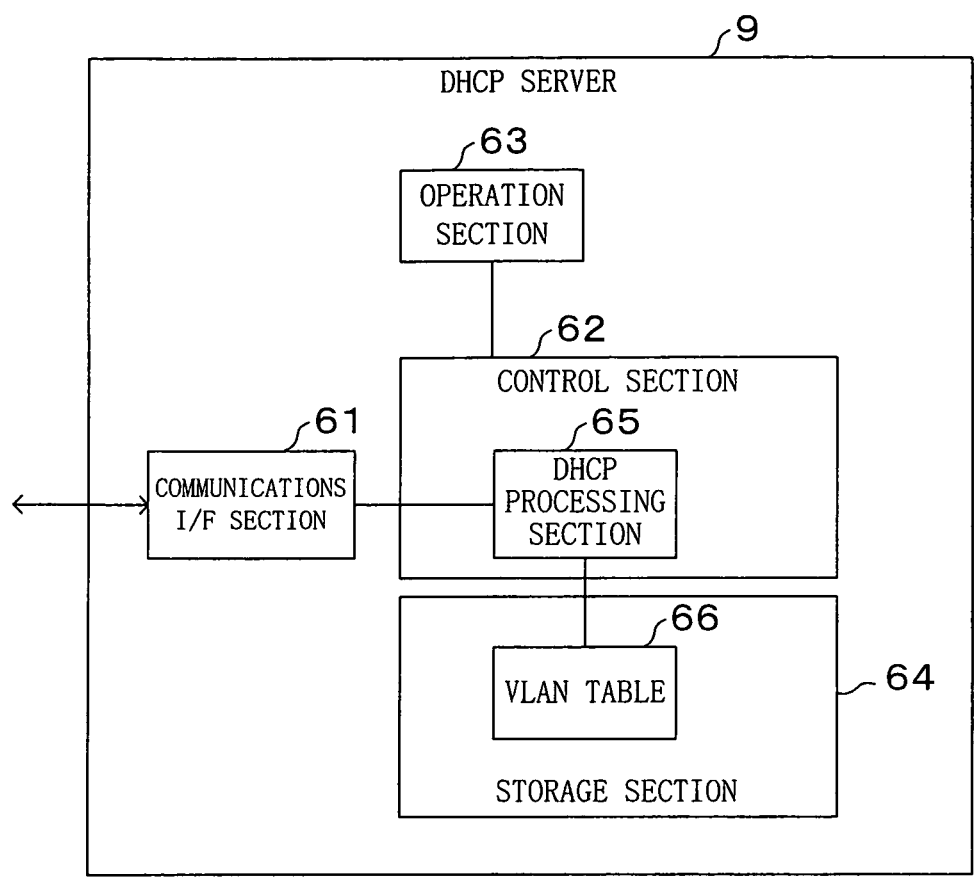
FIG. 16 is a block diagram schematically illustrating the structure of a DHCP server in Structural example 2.

FIG. 16 illustrates the structure of the DHCP server 9 in Structural example 2. As illustrated in FIG. 16, the DHCP server 9 includes a communications I/F section 61, a control section 62, an operation section 63, and a storage section 64.

The communications I/F section 61 serves as an interface for the connection to the communications network. The operation section 63 is used for user's entry of various settings for the DHCP server 9.

The control section 62 controls various operations in the DHCP server 9, and includes a DHCP processing section 65. The DHCP processing section 65 has, in addition to the DHCP processing capability that a normal DHCP server has, the capability of giving the IP address to the printer 7 in such a manner so as to constitute a VLAN according to the capability of the printer 7 and assign the IP address to the printer 7 so that the print 7 belongs to an appropriate VLAN. In doing this, the DHCP processing section 65 uses a VLAN table 66 in the storage section 64.

FIG. 17 illustrates an example of the VLAN table 66. As illustrated in FIG. 17, the VLAN table 66 stores, for each device, the following sets of information: a virtual MAC address, a MAC address, device information, a VLAN number, a subnet address, and IP address. The virtual MAC address, the MAC address, the device information, the VLAN number, and the subnet address are the same as those in the VLAN table 29 illustrated in FIG. 9. The IP address is an IP address given, for each device, by the DHCP processing section 65 so that the device belongs to each VLAN.

(Initial Setting Process in Structural Example 2)

Figure 7:
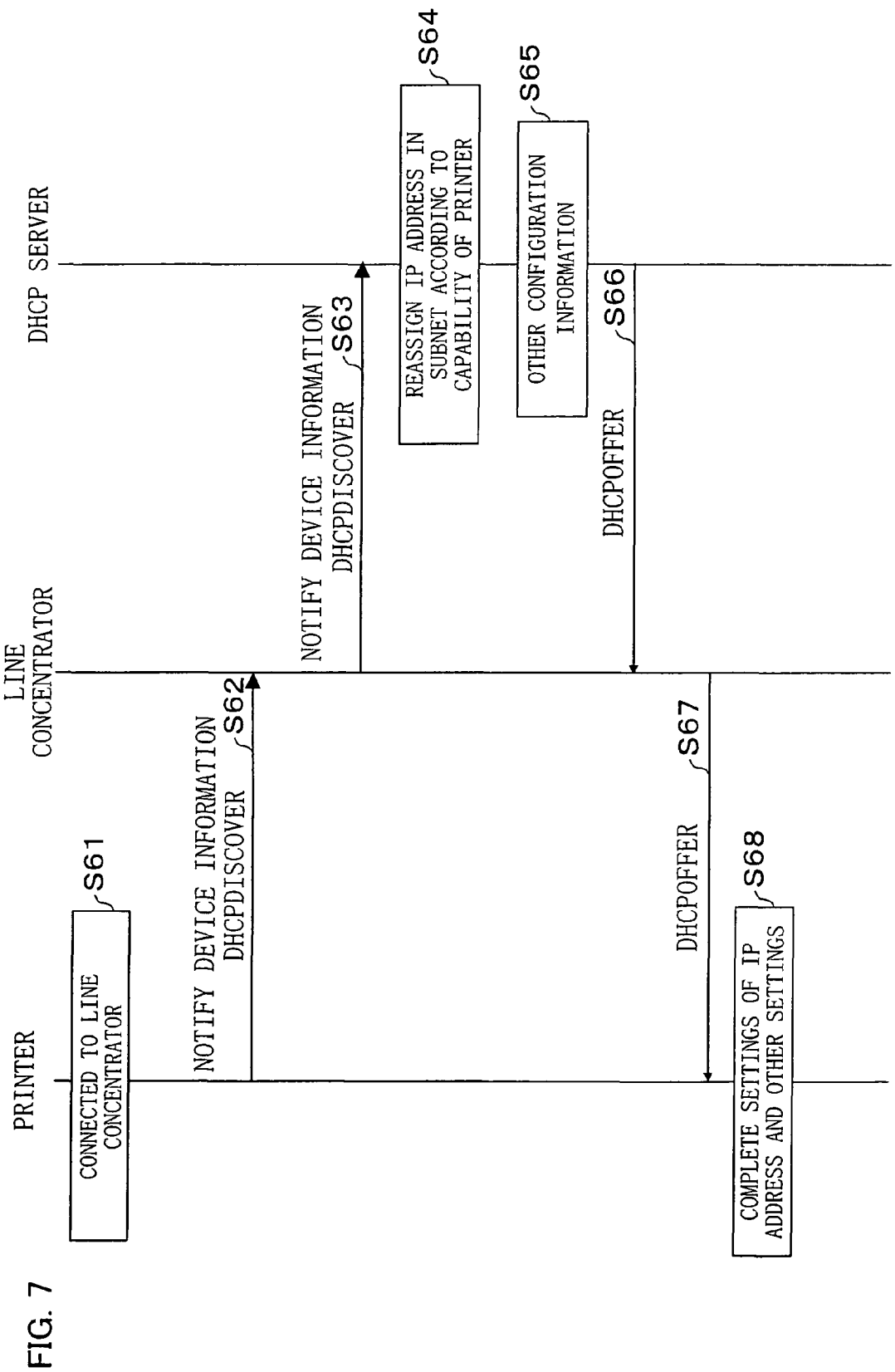
FIG. 7 is a timing chart illustrating the flow of initial setting process performed at the time when the printer is connected to the line concentrator in Structural example 2.

Next, in Structural example 2, the initial setting process performed when the printer 7 is connected to the line concentrator 4 will be described with reference to a timing chart illustrated in FIG. 7. First of all, one printer 7 is connected to the line concentrator 4 (S61). Then, under the communication control section 47 of the printer 7, device information indicating the capability of the printer 7, which is stored in the communications setting information storage section 51, is transmitted from the printer 7 to the line concentrator 4, and subsequently DHCPDISCOVER is transmitted to the line concentrator 4 (S62).

When the line concentrator 4 receives the device information and the DHCPDISCOVER from the printer 7, these sets of information are transmitted from the I/F section 17 to the data buffer 30, and the monitoring section 23 confirms that the received data is device information and DHCPDISCOVER. Confirming the device information and the DHCPDISCOVER, the monitoring section 23 instructs the transmission control section 24 to broadcast the device information and the DHCPDISCOVER to the communications network. Alternatively, if the line concentrator recognizes an address of the DHCP server, the device information and the DHCPDISCOVER may be delivered to that address by using unicasting. If the line concentrator functions as a DHCP relay agent, the DHCPDISCOVER may be transferred to only an appropriate LAN by using broadcasting. This realizes transfer of the device information and the DHCPDISCOVER to the DHCP server 9 (S63).

When the DHCP server 9 receives the device information and the DHCPDISCOVER, the DHCP processing section 65 determines which VLAN the concerned printer 7 should belong to from the received device information. Then, the DHCP processing section 65 registers, in the VLAN table 66, a virtual MAC address configured for the VLAN which the printer 7 is to belong to, a MAC address of the printer 7, the device information, a VLAN number of the VLAN which the printer 7 is to belong to, and a subnet address configured for the VLAN which the printer 7 is to belong to (S64). Further, the DHCP processing section 65 performs setting operation of configuration information such as network parameters according to the contents of the DHCPDISCOVER (S65). Then, in response to the DHCPDISCOVER, the result of the settings is transmitted to the line concentrator 4 in the form of DHCPOFFER including configuration information (S66).

Upon receipt of the DHCPOFFER, the line concentrator 4 first stores the DHCPOFFER into the data buffer 30. When detecting the DHCPOFFER, the monitoring section 23 informs the VLAN setting section 25 of the detection of the DHCPOFFER, and the VLAN setting section 25 registers the contents of the DHCPOFFER in the VLAN table 29. Thereafter, the transmission control section 24 transmits the DHCPOFFER to the printer 7 (S67).

In the printer 7, when the communications I/F section 46 receives the DHCPOFFER, the configuration information, such as the internal IP address, included in the DHCPOFFER is stored by the communication control section 47 into the communications setting information storage section 51 (S68). Through the aforementioned process, the initial setting process performed when the printer 7 is connected to the line concentrator 4 is completed.

(Operations of the Line Concentrator in Structural Example 2)

Figure 12:
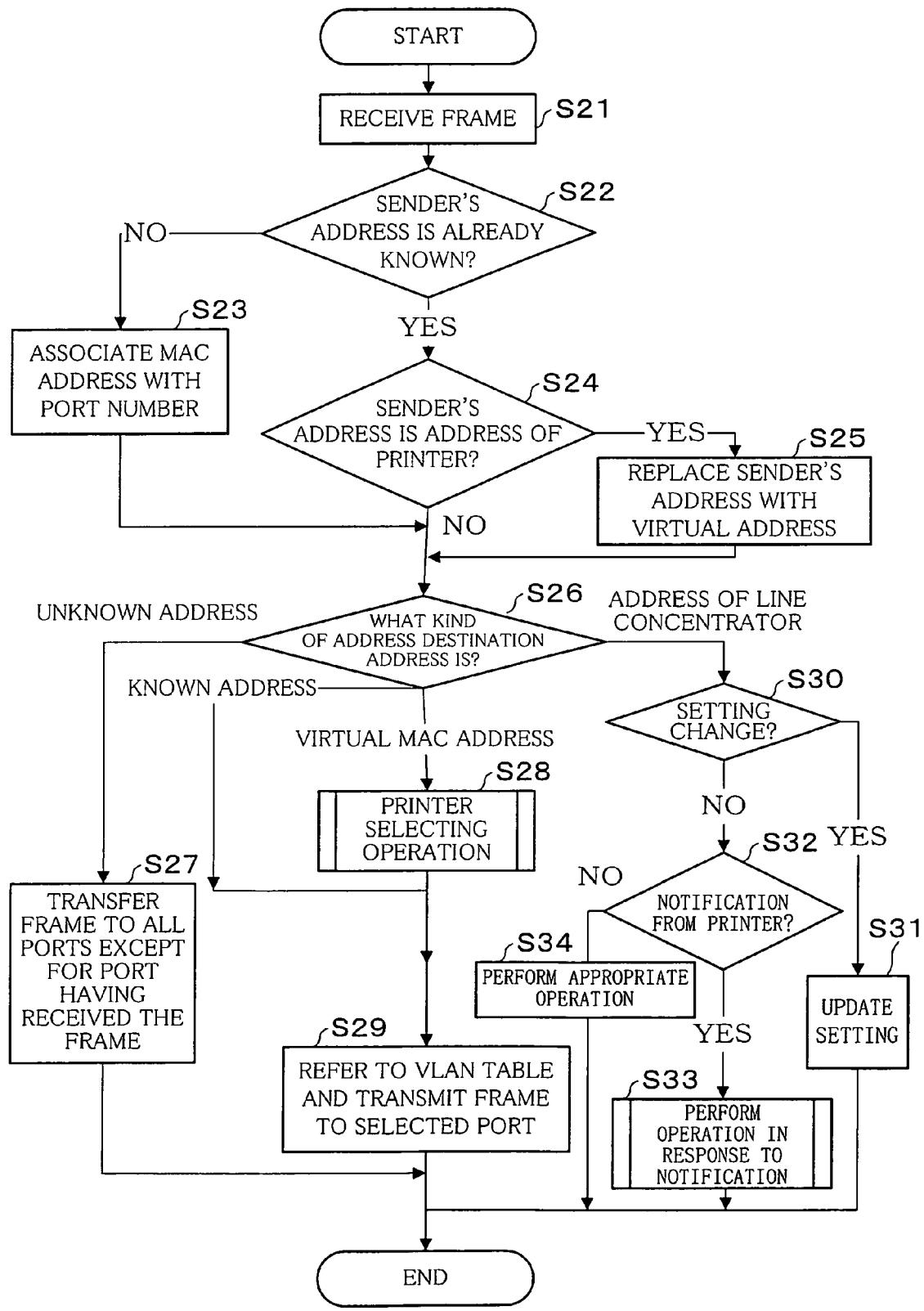
FIG. 12 is a flowchart illustrating the flow of a process performed at the time when the line concentrator receives some kind of frame over a communications network.
Figure 13:
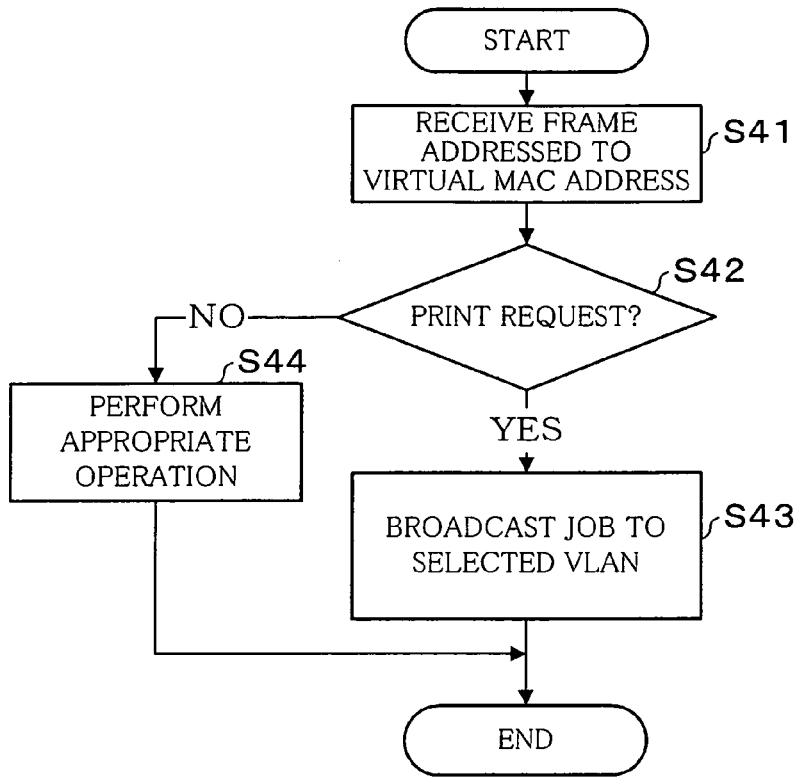
FIG. 13 is a flowchart illustrating the flow of printer selecting process.

A process flow of the line concentrator 4 in Structural example 2 is basically similar to the process flow of the flowchart illustrated in FIG. 12, except that the sender's address replacing operation in S25 of FIG. 12 is not performed in Structural example 2. This is because the IP address assigned to the printer 7 by the DHCP server 9 is directly used. Accordingly, in the structural example, it is not necessary to perform the determination operation in S24 of FIG. 12.

The printer selecting process in S28 and the operation performed in response to the notification from the printer 7 in S33 of the flowchart illustrated in FIG. 12 are performed in a similar manner.

(Structural Example 3 of Image Output System)

In the previously described system, the line concentrator 4 and the DHCP server 9 are provided separately from each other. For example, in a small-size system having only one line concentrator 4, the system may be such that the line concentrator 4 has a simple DHCP server function. Such an image output system 1 will be described as Structural example 3 below.

The structure of the image output system 1 is basically similar to the structure illustrated in FIG. 2, except that the DHCP server 9 is not provided and that the structure of the line concentrator 4 is different.

(Structure of the Line Concentrator in Structural Example 3)

The structure of the line concentrator 4 in the Structural example 3 is basically similar to the structure illustrated in FIG. 1, except that the VLAN setting section 25 has the function of assigning the IP address to each of the printers 7 connected to the line concentrator 4, that the address conversion process performed by the conversion setting section 26 is changed, and that the contents of the VLAN table 29 and the address conversion table 28 are changed. The other arrangements are the same as the previously described arrangements, and explanations thereof are omitted.

FIG. 18 illustrates an example of the VLAN table 29 in Structural example 3. As illustrated in FIG. 18, the VLAN table 29 stores, for each device, the following sets of information: a virtual MAC address; a MAC address; port information; device information; VLAN number; subnet address; and IP address. The virtual MAC address, the MAC address, the port information, the device information, the VLAN number, and the subnet address are the same as those of the VLAN table 29 illustrated in FIG. 9. The IP address is an internal IP address assigned, for each device, by the VLAN setting section 25 so that the device belongs to its corresponding VLAN.

FIG. 11 illustrates an example of the address conversion table 28 in Structural example 3. As illustrated in FIG. 11, the address conversion table 28 stores a combination of the external IP address and the port number and a combination of the internal IP address and the port number.

Here, the internal IP address configured for each of the printers 7 by the VLAN setting section 25 is not open to any network outside the line concentrator 4. As the external IP address, only one virtual IP address is configured for all the printers 7 connected to the line concentrator 4. Therefore, as shown in the address conversion table 28, a TCP (transmission control protocol) port number is used for a means for identifying traffic. Note that, in the address conversion table 28, the port number is considered for the internal IP address. This arrangement is adopted to identify plural sets of traffic caused around the same time in one printer 7.

(Initial Setting Process in Structural Example 3)

Figure 8:
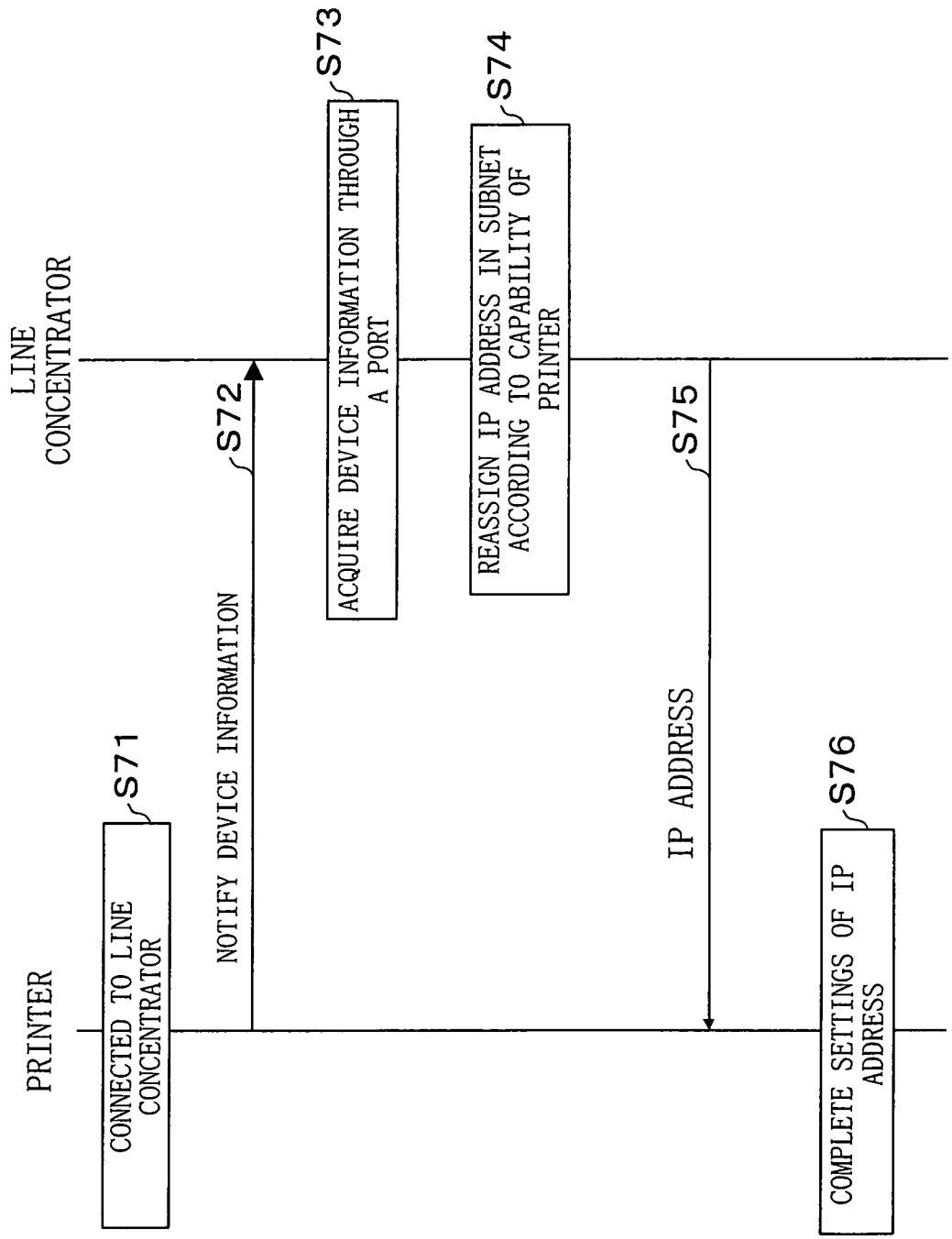
FIG. 8 is a timing chart illustrating the flow of initial setting process performed at the time when the printer is connected to the line concentrator in Structural example 3.

Next, in Structural example 3, initial setting process performed when the printer 7 is connected to the line concentrator 4 will be described with reference to a timing chart illustrated in FIG. 8. First of all, one printer 7 is connected to the line concentrator 4 (S71). Then, under the communication control section 47 of the printer 7, device information indicating the capability of the printer 7, which is stored in the communications setting information storage section 51, is transmitted from the printer 7 to the line concentrator 4 (S72).

When the line concentrator 4 receives device information from the printer 7 (S73), the device information is transmitted from the I/F section 17 to the data buffer 30 and stored in the data buffer 30. Then, the monitoring section 23 detects the data having been stored in the data buffer 30, confirms that such data is data indicating device information, and then transmits this information to the VLAN setting section 25.

The VLAN setting section 25 determines which VLAN the printer 7 should belong to from the received device information. The VLAN setting section 25 registers, in the VLAN table 29, a virtual MAC address corresponding to the VLAN which the printer 7 is to belong to, a MAC address of the printer 7, port information of the port to which the printer 7 is connected, device information, VLAN number of the VLAN which the printer 7 is to belong to, a subnet address corresponding to the VLAN which the printer 7 is to belong to, and an internal IP address (S74). Then, information regarding the internal IP address configured by the VLAN setting section 25 is transmitted to the printer 7 (S75).

In the printer 7, when the communications I/F section 46 receives the information regarding the internal IP address, the information is stored by the communication control section 47 into the communications setting information storage section 51 (S76). Through the aforementioned process, the initial setting process performed when the printer 7 is connected to the line concentrator 4 is completed.

(Operations of the Line Concentrator in Structural Example 3)

A process flow of the line concentrator 4 in Structural example 3 is basically the same as the process flow in the flowchart illustrated in FIG. 12, except for the operation performed in S25 in FIG. 12 when it is determined in S24 that the sender's address matches the MAC address or the internal IP address of the printer 7 registered in the VLAN table 29. If it is determined as such, the determination is notified to the comparison section 22, and the comparison section 22 refers to the address conversion table 28 so as to replace the sender's address of the frame with the virtual MAC address or the virtual IP address (S25). Thereafter, the process moves to S26.

The printer selection process in S28 and the operations performed in response to the notification from the printer 7 in S33 of the flowchart illustrated in FIG. 12 are performed in a similar manner.

(Structure for Realizing the Control Capability in the Line Concentrator, the Printer, and the DHCP Server)

Next, the following will describe the structure for realizing the functional blocks of the line concentrator 4, the printer 7, and the DHCP server 9.

The line concentrator 4 includes the control section 15. The control section 15 includes various functional blocks. These functional blocks can be realized by, for example, a CPU (Central Processing Unit) or other computing means executing program code contained in a ROM (Read Only Memory), RAM (Random Access Memory), or other storage medium. Further, the storage section 16 of the line concentrator 4 can be realized by, for example, a nonvolatile storage medium such as flash EEPROM.

Further, the printer 7 includes the printer controller 41. The printer controller 41 includes the functional block, termed the communication control section 47. This functional block is also realized by, for example, a CPU or other computing means executing program code contained in a ROM, RAM, or other storage medium. Further, the communications setting information storage section 51 of the printer controller 41 can be realized by, for example, a nonvolatile storage medium such as flash EEPROM.

Further, the DHCP server 9 includes the control section 62. The control section 62 includes the functional block, termed the DHCP processing section 65. This functional block is realized by, for example, a CPU or other computing means executing program code contained in a ROM, RAM, or other storage medium. Further, the storage section 64 of the DHCP server 9 can be realized by, for example, a nonvolatile storage medium such as flash EEPROM or hard disk.

The description above took as an example cases where the functional blocks are realized by a CPU or other computing means executing program code contained in a ROM, RAM, or other storage medium. Alternatively, the function blocks may be realized by hardware carrying out the same processes. A further alternative is a combination of hardware carrying out some of the processes and computing means controlling the hardware and executing program code for the other processes. Further, those members which were described as hardware may be realized by a combination of hardware carrying out some of the processes and computing means controlling the hardware and executing program code for the other processes. The computing means may be a single entity, or a set of computing means connected over internal device bus and various communications paths may work together to execute program code.

The program code itself directly executable by the computing means or the program as data that can generate program code by decompression or an other process (detailed later) is executed by the computing means after the program (program code or the data) is recorded and distributed on a storage medium or the program is transmitted and distributed over communications means which transmits the program over wired or wireless communications paths.

To transmit over a communications path, a program is transmitted though the communications path by means of a series of signals indicative of a program which propagate through the transmission media constituting the communications path. To transmit a series of signals, a transmitter device may modulate a carrier wave with the series of signals indicative of the program to transmit the series of signals on the carrier wave. In this case, a receiver device will restore the series of signals by demodulating the carrier wave. Meanwhile, when transmitting the series of signals, the transmitter device may divides the series of signals as a series of digital data into packets for a transmission. In this case, the receiver device will combine received group of packets to restore the series of signals. In addition, the transmitter device may transmit the series of signals by time division, frequency division, code division, or another multiplex scheme involving the series of signals and another series of signals. When this is the case, the receiver device will extract individual series of signals from a multiplex series of signals to restore them. In any case, similar effects are obtained if the program can be transmitted over a communications path.

Here, the storage medium for the distribution of a program is preferable removable. After the distribution of the program, the storage medium may or may not be removable. In addition, the storage medium may or may not be rewriteable (writeable) or volatile, be recordable by any method, and come in any shape at all, provided that the medium can hold the program. Examples of such a storage medium include tapes, such as magnetism tapes and cassette tapes; magnetic disks, such as floppy® disks and hard disks; and other discs, such as CD-ROMs, magneto-optical discs (MOs), mini discs (MDs), and digital video discs (DVDs). In addition, the storage medium may be a card, such as an IC card or an optical card; a semiconductor memory, such as a mask ROM, an EPROM, an EEPROM, or a flash ROM; or a memory provided inside a CPU or other computing means.

The program code may be such that it instructs the computing means regarding all the procedures of the processes. If there is already a basic computer program (for example, an operating system or library) which can be retrieved by a predetermined procedure to execute all or some of the processes, code or a pointer which instructs the computing means to retrieve that basic computer program can replace all or some of the processes.

In addition, the program storage format of the storage medium may be, for example, such that: the computing means can access the program for an execution as in an actual memory having loaded the program; the program is not loaded into an actual memory, but installed in a local storage medium (for example, an actual memory or hard disk) always accessible to the computing means; or the program is stored before installing in a local storage medium from a network or a mobile storage medium. In addition, the program is not limited to compiled object code. The program may be stored as source code or intermediate code generated in the course of interpretation or compilation. In any case, similar effects are obtained regardless of the format in which the storage medium stores the program, provided that decompression of compressed information, decoding of encoded information, interpretation, compilation, links, or loading to a memory or combinations of these processes can convert into a format executable by the computing means.

(Contrast Among Structural Examples)

In the case of Structural example 1, the line concentrator 4 converts the IP address of the frame transmitted/received to/from the printer 7. This conceals the IP addresses of the respective printers 7 from outside, thus improving security. The DHCP server 9 can be a normal DHCP server, and thus it is not necessary to provide a special DHCP server.

In the case of Structural example 2, the DHCP server 9 performs the settings of the IP address in consideration of the VLAN determined according to the capability of the printer 7. This eliminates the need for the address conversion process of the line concentrator 4. Thus, the Structural example 2 allows the line concentrator 4 to attain a higher transfer rate than the Structural example 1. Further, the Structural example 2 eliminates the need for providing the line concentrator 4 with the arrangement for the address conversion process. This can simplify the structure of the line concentrator 4.

In the case of Structural example 3, it is not necessary to provide the DHCP server. For example, with a small-size system, it is possible to realize the image output system 1 only by providing the line concentrator 4. Further, it is possible to conceal the IP addresses and MAC addresses of the respective printers from outside, thus improving security.

Thus, a line concentrator and a relay control method according to the present invention, as described above, are arranged such that storage means stores therein a group information table which classifies information processing devices into groups and lists virtual addresses respectively corresponding to the groups. Data monitoring means, upon receipt of data addressed to the virtual address, performs controls so that the received data is transmitted to all of the information processing devices belonging to the group corresponding to the virtual address.

In the above arrangement, the line concentrator according to the present invention may be arranged such that the group information table further holds information regarding the ports to which the information processing devices are connected. With this arrangement, it is possible to accurately grasp the relationship between the connected information processing devices and the ports to which the information processing devices are connected. That is, all combinations of the ports and the information processing devices can be supported appropriately. This allows for free combinations of the ports and the information processing devices.

At the time of data transfer, the group information table is referred to, so that it is possible to determine which port data should be transmitted to. This eliminates the need for flooding for confirming a destination. This makes it possible to reduce unnecessary traffic.

Further, in the above arrangement, the line concentrator according to the present invention may be arranged such that the group information table further holds information regarding subnet addresses corresponding to the respective groups. With this arrangement, the data monitoring means, upon receipt of data addressed to a virtual address, performs controls so as to transmit the received data to all of the information processing devices having a subnet address corresponding to the target group. That is, it is not necessary to consider addresses of the respective information processing devices, so that it is possible to more rapidly perform the transfer processing.

In the above arrangement, the line concentrator according to the present invention may be arranged such that when the data monitoring means has detected reception of initiation notification data, processing means instructs the information processing devices, except for the information processing device having transmitted the initiation notification data, among the information processing devices having received the previously transmitted data, not to initiate information processing of the previously transmitted data. This can prevent a plurality of information processing devices having received one and the same data from redundantly processing the data.

In the above arrangement, the line concentrator according to the present invention may be arranged such that when the data monitoring means has detected reception of completion notification data, the processing means instructs the information processing devices, except for the information processing device having transmitted the completion notification data, among the information processing devices having received the previously transmitted data, to cancel information processing of the previously transmitted data. This can prevent such an event that one information processing device prepares for information processing of one data even through another information processing device has completed processing the same data.

In the above arrangement, the line concentrator according to the present invention may be such that device classifying means can perform setting and updating of the group information table. With this arrangement, even when there occurs change of the information processing device connected, it is possible to update the group information table correspondingly.

Further, in the above arrangement, the line concentrator according to the present invention may be such that the device classifying means performs group information table registration process in accordance with the device information having been received from the connected information processing device connected thereto. With this arrangement, upon receipt of device information from one information processing device at the point of time when the connection with the information processing device becomes active, registration of the information processing device with the group information table is readily performed. Thus, it is possible to flexibly respond to changes of the connection.

Further, in the above arrangement, the line concentrator according to the present invention may be such that when IP address is assigned to the information processing device by the DHCP server, address conversion setting means stores in the storage means an address conversion table that indicates correspondence between the IP address and an internal IP address corresponding to a group. With this arrangement, the line concentrator converts the IP addresses of the respective information processing devices when they transmit/receive data. This conceals the IP addresses of the respective information processing devices from outside, thus improving security. The DHCP server can be a normal one having DHCP capability, and thus it is not necessary to provide a special DHCP server.

In the above arrangement, the line concentrator according to the present invention may be such that the device classifying means assigns an internal IP address corresponding to a group to the information processing device connected thereto, in accordance with device information having been received from the information processing device connected thereto. With this arrangement, the line concentrator assigns an IP address to the information processing device connected thereto, which eliminates the need for provision of the DHCP server on the communications network which the line concentrator and the information processing device belong to. For example, in a small-size system, it is possible to realize a network system only by providing the line concentrator. Moreover, this conceals the IP addresses of the respective information processing devices from outside, thus improving security.

In the above arrangement, the line concentrator according to the present invention may be such that when the DHCP server assigns to an information processing device an IP address corresponding to a group to which the information processing device belongs, the device classifying means resisters this IP address with the group information table. With this arrangement, it is not necessary for the line concentrator to perform the grouping process in consideration of capabilities of the information processing devices, so that it is possible to simplify the structure of the line concentrator. Further, it is not necessary to perform the process of converting an IP address assigned by the DHCP server, for example, into an internal IP address. This increases a speed of the transfer process performed by the line concentrator. Still further, it is not necessary for the line concentrator to have the arrangement for address conversion process. This further simplifies the structure of the line concentrator.

As described above, the information processing system according to the present invention is arranged in such a manner that the line concentrator according to the present invention and the information processing device according to the present invention are connected to each other via a transmission medium.

As described above, the information processing system according to the present invention is arranged in such a manner that the line concentrator according to the present invention, the information processing device according to the present invention, and a DHCP server are connected to one another via a transmission medium.

As described above, the information processing system according to the present invention is arranged in such a manner that the line concentrator according to the present invention, the information processing device according to the present invention, and the DHCP server according to the present invention are connected to one another via a transmission medium.

Further, as described above, the information processing system may be such that one or more line concentrators share the group information table. This arrangement allows the line concentrators to operate as if they were one line concentrator. Such an arrangement can appropriately respond to even a large-size network. Note that sharing of the group information table by the line concentrators can be realized by causing VTP to operate on a trunk link between the line concentrators.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

An image output system according to the present invention can be applied to an image output system such as a print system where a plurality of external devices such as a copier, a scanner, and an MFP (Multi Function Printer) are connected to one another via a network. This allows for a suitable distribution control of print jobs, without providing an expensive device such as a print server and without resulting in increase of unnecessary traffic. Moreover, it is possible to reduce a processing time between the issuance of a print instruction by a host and a print output.

The invention claimed is:

1. A line concentrator which relays data transmission via a transmission medium, the line concentrator comprising:
   a control section provided within the line concentrator and which controls operations performed in the line concentrator;
   a storage section which stores within the line concentrator, a group information table (i) classifying information processing devices connected via the transmission medium into groups according to capabilities of the information processing devices and (ii) listing virtual addresses corresponding to the respective groups;
   wherein the control section includes a data monitoring section which refers to the group information table stored in the storage section upon receipt of data addressed to the virtual address, and performs controls so that the received data is transmitted to all of the information processing devices belonging to the group corresponding to the virtual address to which the received data is addressed;
   wherein when one of the information processing devices initiates information processing on the data that was previously transmitted to all the information processing devices of a particular group that is capable of performing information processing of the data, initiation notification data is transmitted by said one of the information processing devices;
   wherein when the received data by the control section is the initiation notification data transmitted from said one of the information processing device, the control section performs controls so as to transmit a given instruction data to other information processing devices which are information processing devices that belong to the particular group except for said one of the information processing devices, the given instruction data instructs the other information processing devices to suspend initiation of the information processing on the previously transmitted data; and
   an interface section which sends data for information processing to all of the information processing devices which belong to the particular group.

2. A line concentrator which relays data transmission via a transmission medium, the line concentrator comprising:
   a control section provided within the line concentrator and which controls operations performed in the line concentrator;
   a storage section which stores within the line concentrator, a group information table (i) classifying information processing devices connected via the transmission medium into groups according to capabilities of the information processing devices and (ii) listing virtual addresses corresponding to the respective groups;
   wherein the control section includes a data monitoring section which refers to the group information table stored in the storage section upon receipt of data addressed to the virtual address, and performs controls so that the received data is transmitted to all of the information processing devices belonging to the group corresponding to the virtual address to which the received data is addressed;
   wherein when one of the information processing devices completes information processing on the data that was previously transmitted to all the information processing devices of a particular group that is capable of performing information processing of the data, completion notification data is transmitted by said one of the information processing devices;
   wherein when the received data by the control section is the completion notification data transmitted from said one of the information processing devices, the control section performs controls so as to transmit another given instruction data to other information processing devices, which are information processing devices that belong to the particular group except for said one of the information processing devices, the another given instruction data instructing the other information processing devices to cancel the information processing on the previously transmitted data; and
   an interface section which sends data for information processing to all of the information processing devices which belong to the particular group.

3. The line concentrator according to claim 1 or 2, further comprising:
   ports to which the information processing devices are connected respectively via the transmission medium, and
   the group information table further holding information regarding the ports to which the information processing devices are connected.

4. The line concentrator according to claim 1 or 2, wherein:
   the group information table further holds information regarding subnet addresses corresponding to the respective groups.

5. The line concentrator according to claim 1 or 2, wherein:
   the control section further includes a device classifying section which performs setting and updating of the group information table.

6. The line concentrator according to claim 5, wherein:
   the device classifying section further gives, to the information processing device having transmitted the device information, an internal IP address corresponding to a group which the information processing device belongs to, and performs controls so that data is transmitted for notifying the information processing device of the internal IP address.

7. A DHCP server which is connected via a transmission medium to the line concentrator according to claim 6, comprising:
   a control section which controls operations performed in the DHCP server; and
   a storage section which stores a group information table (i) classifying information processing devices connected to the line concentrator into groups according to capabilities of the information processing devices and (ii) listing IP addresses corresponding to the respective groups,
   the control section including a DHCP processing section which, upon receipt of device information indicating capability of the information processing device connected to the line concentrator via the line concentrator from the information processing device, (a) determines a group to which the information processing device is to belong in accordance with the received device information, (b) sets an IP address corresponding to the determined group, (c) registers the information processing device with the group information table, and (d) performs controls so as to transmit the set IP address to the line concentrator.

8. A DHCP processing method performed by a DHCP server connected via a transmission medium to the line concentrator according to claim 6,
   the method comprising:
   the step of storing a group information table (i) classifying information processing devices connected to the line concentrator into groups according to capabilities of the information processing devices and (ii) listing IP addresses corresponding to the respective groups; and the step of, upon receipt of device information indicating capability of the information processing device connected to the line concentrator via the line concentrator from the information processing device, (a) determining a group to which the information processing device is to belong in accordance with the received device information, (b) setting an IP address corresponding to the determined group, (c) registering the information processing device with the group information table, and (d) performing controls so as to transmit the set IP address to the line concentrator.

9. An information processing system including the line concentrator according to claim 6, an information processing device that is connected to the line concentrator via a transmission medium, and a DHCP server that is connected to the line concentrator via the transmission medium, where:

said information processing device includes:
- a storage section which stores device information indicating capability of the information processing device, and
- a communication control section which, when said information processing device is connected to the line concentrator, performs controls so as to transmit the device information stored in the storage section to the line concentrator; and said DHCP server includes:
- a control section which controls operations performed in the DHCP server, and
- a storage section which stores a group information table (i) classifying information processing devices connected to the line concentrator into groups according to capabilities of the information processing devices and (ii) listing IP addresses corresponding to the respective groups, and
- wherein said control section includes a DHCP processing section which, upon receipt of device information indicating capability of the information processing device connected to the line concentrator from the information processing device, (a) determines a group to which the information processing device belongs to in accordance with the received device information, (b) sets an IP address corresponding to the determined group, (c) registers the information processing device with the respective group in the group information table, and (d) performs controls so as to transmit the set IP address to the line concentrator.

10. The information processing system according to claim 9, wherein:

the line concentrator may be one or more line concentrators, and the line concentrators share the group information table.

11. The line concentrator according to claim 2, wherein:

when the data monitoring section has detected that device information was received from a connected information processing device, the device information indicating capability of the connected information processing device, the device classifying section determines which group the connected information processing device is to belong to according to the received device information and registers the connected information processing device with the group information table.

12. An information processing system including the line concentrator according to claim 11, and an information processing device that is connected to the line concentrator via a transmission medium, and a DHCP server that is connected to the line concentrator via a transmission medium, wherein:

said information processing device includes:
- a storage section which stores device information indicating capability of the information processing device, and
- a communication control section which, when said information processing device is connected to the line concentrator, performs controls so as to transmit the device information stored in the storage section to the line concentrator.

13. The information processing system according to claim 12, wherein:

the line concentrator may be one or more line concentrators, and the line concentrators share the group information table.

14. The line concentrator according to claim 1 or 2, wherein:

the control section further includes an address conversion setting section which, when the data monitoring section has detected that data regarding an IP address given to a connected information processing device was received from an external DHCP server, generates an address conversion table which converts the IP address into an internal IP address corresponding to a group which the connected information processing device belongs to, stores the address conversion table into the storage section, and performs controls so as to transmit data notifying the internal IP address to the connected information processing device.

15. The line concentrator according to claim 2, wherein:

when data regarding an IP address being given to a connected information processing device and corresponding to a group which the information processing device belongs to has been received from an external DHCP server, the device classifying section registers the IP address with the group information table.

16. A computer-readable storage medium on which is stored a relay control program, the relay control program causing a computer to implement the control section in the line concentrator according to claim 1 or 2.

17. An information processing device which is connected via a transmission medium to the line concentrator according to claim 1 or 2, the information processing device comprising:
- a storage section which stores device information indicating capability of the information processing device; and
- a communication control section which, when said information processing device is connected to the line concentrator, performs controls so as to transmit the device information stored in the storage section to the line concentrator.

18. A computer-readable storage medium on which is stored a DHCP processing program, the DHCP processing program causing a computer to implement the control section in the DHCP server according to claim 17.

19. An information processing system including the line concentrator of claim 1 or 2 and an information processing device that is connected to the line concentrator via a transmission medium, wherein:

said information processing device includes:
- a storage section which stores device information indicating capability of the information processing device, and
- a communication control section which, when said information processing device is connected to the line concentrator, performs controls so as to transmit the device information stored in the storage section to the line concentrator.

20. The information processing system according to claim 19, wherein:
the line concentrator may be one or more line concentrators, and the line concentrators share the group information table.

21. A relay control method of a line concentrator which relays data transmission via a transmission medium, the method comprising:
the step of storing a group information table (i) classifying information processing devices connected via the transmission medium, into groups according to capabilities of the information processing devices and (ii) listing virtual addresses corresponding to the respective groups;
the step of referring to the group information table upon receipt of data (received data) addressed to the virtual address and performing controls so that the received data is transmitted to all of the information processing devices belonging to the group corresponding to the virtual address to which the received data is addressed;
the step of providing initiation notification data from one of the information processing devices, said one of the information processing devices being the processing device which initiates information processing on the data that was previously transmitted to all the information processing devices of a particular group that is capable of performing information processing of the data;
wherein when the received data is initiation notification data transmitted from said one of the information processing devices, the step of transmitting instruction data to other information processing devices, which are information processing devices that belong to the particular group except for said one of the information processing devices, the instruction data instructs the other information processing devices to suspend initiation of the information processing on the previously transmitted data; and
providing an interface section which sends data for information processing to all of the information processing devices which belong to the particular group.

22. A relay control method of a line concentrator which relays data transmission via a transmission medium, the method comprising:
the step of storing a group information table (i) classifying information processing devices connected via the transmission medium, into groups according to capabilities of the information processing devices and (ii) listing virtual addresses corresponding to the respective groups;
the step of referring to the group information table upon receipt of data addressed to the virtual address and performing controls so that the received data is transmitted to all of the information processing devices belonging to the group corresponding to the virtual address to which the received data is addressed; and
the step of providing completion notification data transmitted from one of the information processing devices, said one of the information processing devices being the processing device which completes information processing on data having been previously transmitted to all the information processing devices which belongs to a particular group that is capable of performing information processing of the data;
wherein when the received data is the completion notification data transmitted from said one of the information processing devices, the step of transmitting instruction data to other information processing devices, which are information processing devices that belong to the particular group except for said one of the information processing devices, the instruction data instructing the other processing devices to cancel the information processing on the previously transmitted data; and
the step of providing an interface section which sends data for information processing to all of the information processing devices which belong to the particular group.

\* \* \* \* \*